(12) United States Patent
Hodgson et al.

(10) Patent No.: US 10,559,440 B2
(45) Date of Patent: Feb. 11, 2020

(54) SWITCH MECHANISM FOR A VEHICLE INTERIOR COMPONENT

(71) Applicant: Shanghai Yanfeng Jinqiao Automotive Trim Systems Co. Ltd., Novi, MI (US)

(72) Inventors: Thomas Scott Hodgson, Holland, MI (US); Rick Alan Anderson, Grand Haven, MI (US); Randy Len Arendsen, Zeeland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 16/131,288

(22) Filed: Sep. 14, 2018

(65) Prior Publication Data

US 2019/0013165 A1    Jan. 10, 2019

Related U.S. Application Data

(63) Continuation of application No. PCT/US2017/024338, filed on Mar. 27, 2017.
(Continued)

(51) Int. Cl.
*H01H 1/36* (2006.01)
*H01H 25/00* (2006.01)
(Continued)

(52) U.S. Cl.
CPC ......... *H01H 25/002* (2013.01); *B60R 16/005* (2013.01); *H01H 15/10* (2013.01);
(Continued)

(58) Field of Classification Search
CPC ........ H01H 1/365; H01H 15/06; H01H 15/10; H01H 15/04; H01H 1/36; H01H 1/40;
(Continued)

(56) References Cited

U.S. PATENT DOCUMENTS

| 3,567,891 A | 3/1971 | Rudolf |
| 4,152,565 A | 5/1979 | Rose |

(Continued)

FOREIGN PATENT DOCUMENTS

| CN | 102237217 A | 11/2011 |
| CN | 103000426 A | 3/2013 |

(Continued)

OTHER PUBLICATIONS

First Office Action from the State Intellectual Property Office of the People's Republic of China for CN Patent Application No. 201780017859.5A dated Jul. 2, 2019 (English translation) (5 Pages).

*Primary Examiner* — Ahmed M Saeed

(57) ABSTRACT

A switch mechanism for a vehicle interior is disclosed. The switch mechanism may comprise a slide within a carrier, at least one pin movable within the slide to center the slide in the carrier and a spring to move the pin within the slide. The pin may comprise a protrusion movable against the slide to guide pin movement. The slide may comprise a rib; the protrusion may slide against the rib to guide pin movement. The rib may comprise two ribs; the protrusion may move between the two ribs. The spring may be contained within an opening in the slide; the rib may extend beyond the opening. The pin may comprise first and second guides to slide along first and second slide walls to guide pin movement. The vehicle interior component may be at least one of a console, an overhead console, a vehicle system actuator, a sunroof actuator.

21 Claims, 12 Drawing Sheets

Related U.S. Application Data

(60) Provisional application No. 62/314,990, filed on Mar. 30, 2016, provisional application No. 62/336,358, filed on May 13, 2016.

(51) Int. Cl.
*B60R 16/00* (2006.01)
*H01H 15/10* (2006.01)
*H01H 3/50* (2006.01)

(52) U.S. Cl.
CPC ............... *H01H 25/00* (2013.01); *H01H 3/50* (2013.01); *H01H 2025/004* (2013.01); *H01H 2221/058* (2013.01); *H01H 2231/026* (2013.01); *H01H 2300/006* (2013.01)

(58) Field of Classification Search
CPC .... H01H 1/50; H01H 2221/014; H01H 25/00; H01H 25/002; H01H 2231/026; H01H 3/50; H01H 2025/004; H01H 2025/043; H01H 2221/058; H01H 13/70; H01H 25/04; H01H 2300/006; B60R 16/005
See application file for complete search history.

(56) References Cited

U.S. PATENT DOCUMENTS

| | | | |
|---|---|---|---|
| 4,316,067 A | 2/1982 | Whiteman | |
| 4,654,487 A | 3/1987 | Sawada | |
| 4,689,450 A | 8/1987 | Sawada | |
| 4,704,503 A | 11/1987 | Takasawa | |
| 4,775,767 A | 10/1988 | Sawada et al. | |
| 4,831,349 A | 5/1989 | Hirose et al. | |
| 4,876,493 A | 10/1989 | Suzuki | |
| 4,918,264 A | 4/1990 | Yamamoto et al. | |
| 5,063,479 A | 11/1991 | Satoh | |
| 5,285,039 A | 2/1994 | Satoh | |
| 5,293,507 A | 3/1994 | Hayakawa | |
| 5,426,275 A | 6/1995 | Maeda et al. | |
| 5,623,134 A | 4/1997 | Hayakawa | |
| 5,721,405 A | 2/1998 | Hamada | |
| 5,753,874 A | 5/1998 | Kossakowski | |
| 5,902,972 A | 5/1999 | Nestor et al. | |
| 5,920,042 A | 7/1999 | Gotoh | |
| 6,046,414 A * | 4/2000 | Hirschfeld | H01H 25/006 200/18 |
| 6,686,550 B2 | 2/2004 | Seki et al. | |
| 6,750,406 B2 | 6/2004 | Komatsu et al. | |
| 6,891,114 B2 | 5/2005 | Peterson | |
| 6,903,293 B2 | 6/2005 | Sasaki | |
| 7,084,359 B1 | 8/2006 | Konno | |
| 7,098,415 B2 | 8/2006 | Onodera | |
| 7,122,756 B2 | 10/2006 | Sasaki et al. | |
| 8,338,733 B2 | 12/2012 | Yang et al. | |
| 8,466,384 B2 | 6/2013 | Villain | |
| 8,530,770 B2 | 9/2013 | Miwa et al. | |
| 8,598,475 B2 | 12/2013 | Leng et al. | |
| 8,690,235 B2 | 4/2014 | Lee et al. | |
| 8,952,281 B2 | 2/2015 | Muto | |
| 2006/0131140 A1 | 6/2006 | Oh | |
| 2007/0051592 A1 | 3/2007 | Hyumet et al. | |
| 2011/0233038 A1 | 9/2011 | Lipkaet et al. | |
| 2012/0318652 A1 | 12/2012 | Kokubuet et al. | |
| 2013/0068598 A1 * | 3/2013 | Muto | H01H 25/002 200/329 |

FOREIGN PATENT DOCUMENTS

| | | |
|---|---|---|
| DE | 3706681 A1 | 9/1988 |
| DE | 3931722 C1 | 12/1990 |
| DE | 3931722 C2 | 4/1994 |
| DE | 4242100 A1 | 6/1994 |
| DE | 19746439 A1 | 4/1999 |
| DE | 102005046240 A1 | 4/2007 |
| DE | 102010029742 A1 | 12/2011 |
| DE | 102010033218 A1 | 2/2012 |
| DE | 102010054738 A1 | 6/2012 |
| DE | 102011007915 A1 | 10/2012 |
| DE | 102012018726 A1 | 3/2014 |
| EP | 0602462 B1 | 10/1996 |
| EP | 0678883 B1 | 2/1998 |
| EP | 2020667 B1 | 8/2009 |
| EP | 1239502 B1 | 9/2011 |
| EP | 2533368 A1 | 12/2012 |
| EP | 2708971 A2 | 3/2014 |

* cited by examiner

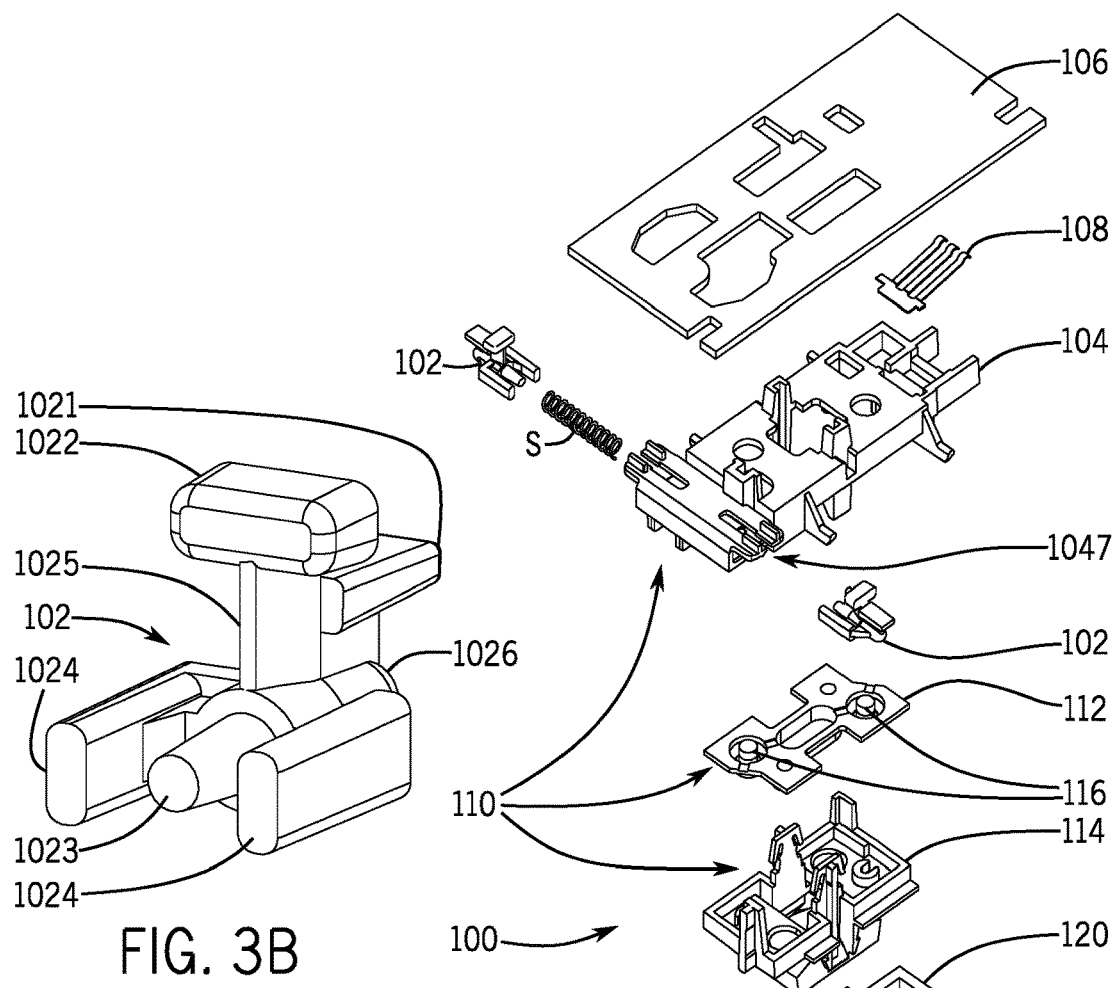
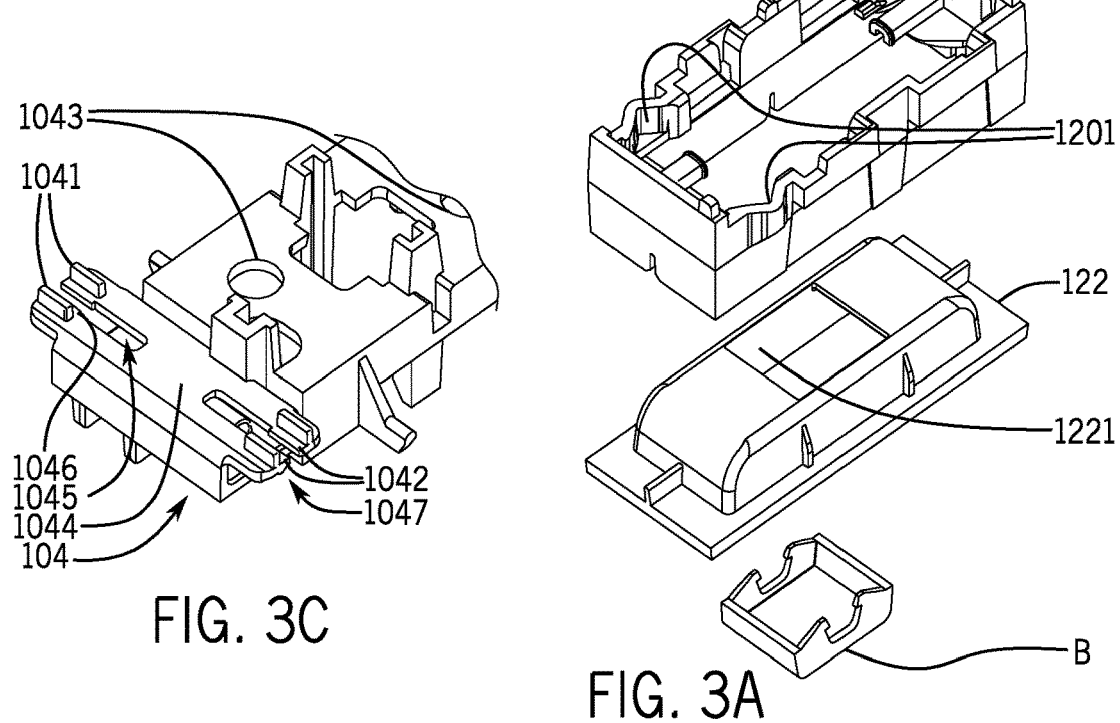
FIG. 3B
FIG. 3C
FIG. 3A

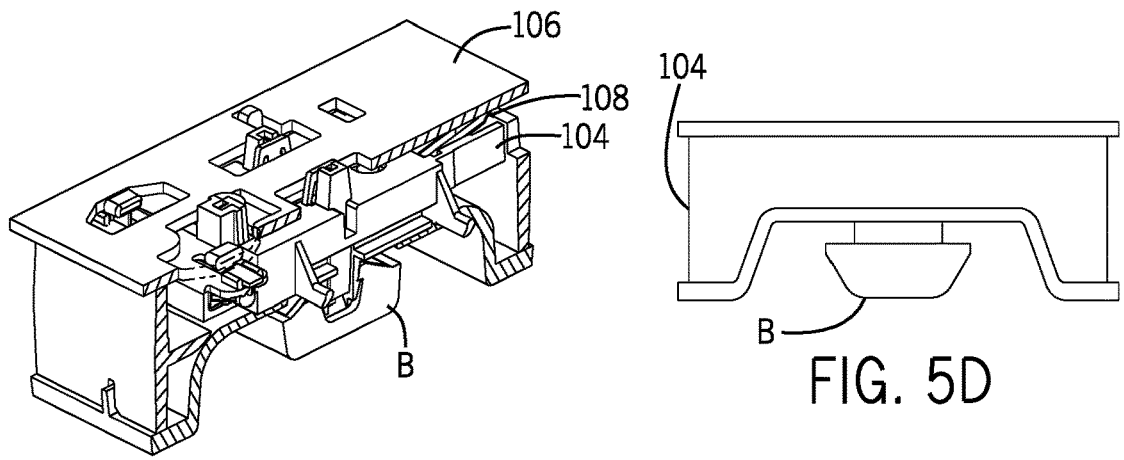
FIG. 5A
FIG. 5D
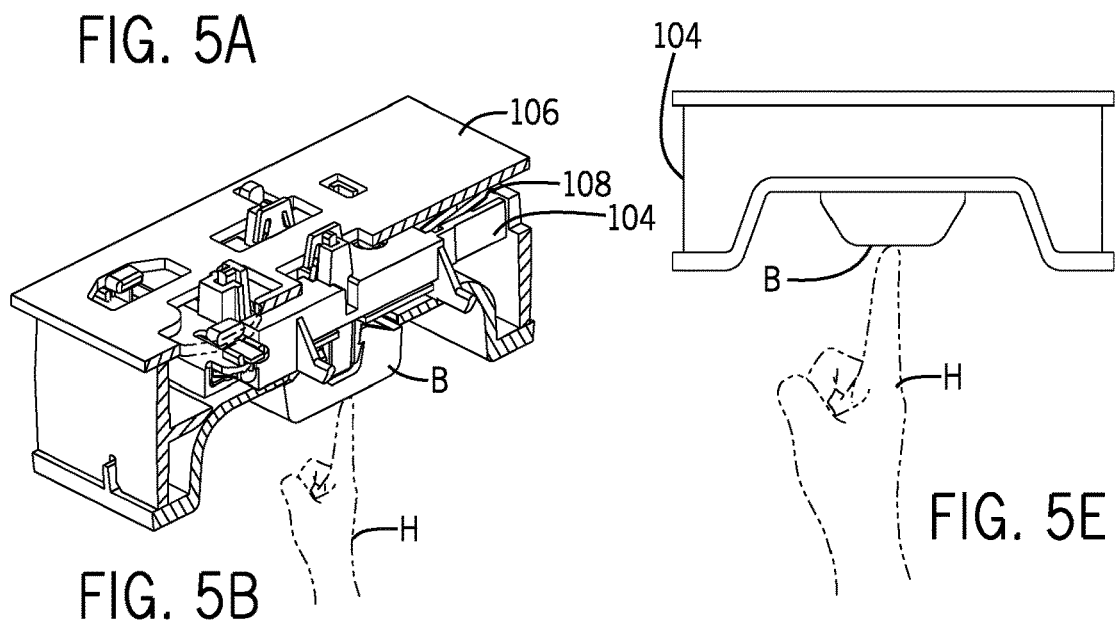
FIG. 5B
FIG. 5E
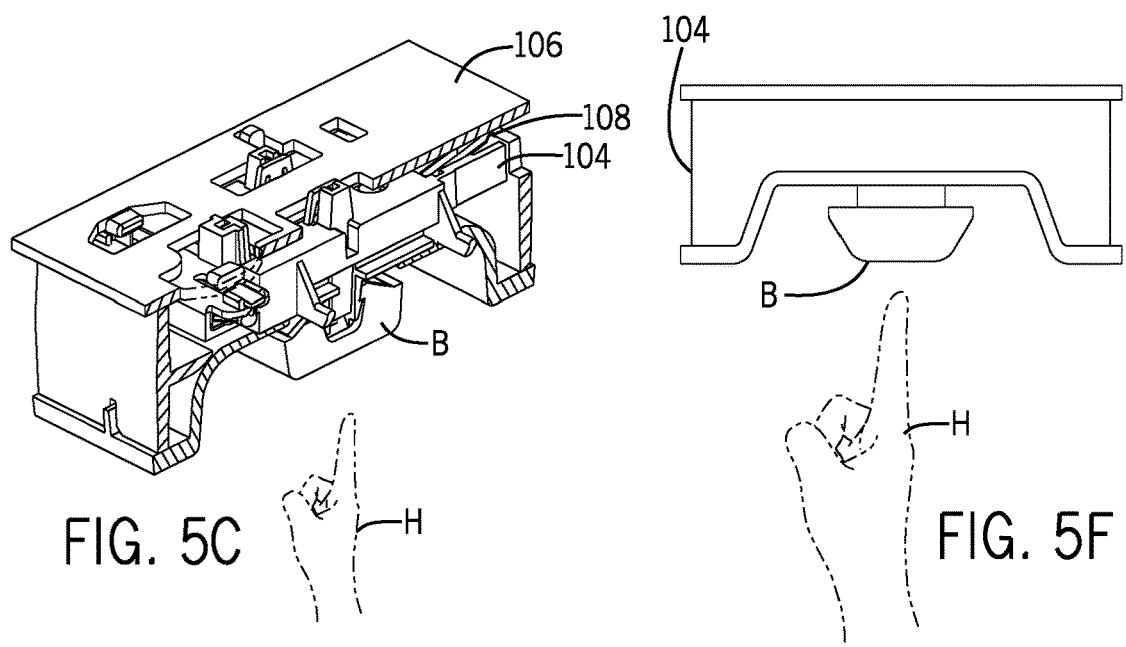
FIG. 5C
FIG. 5F

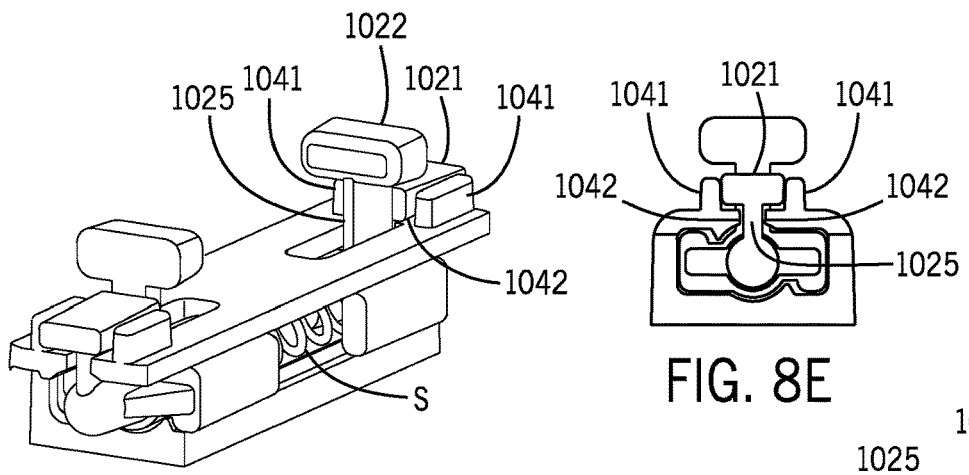
FIG. 8D
FIG. 8E
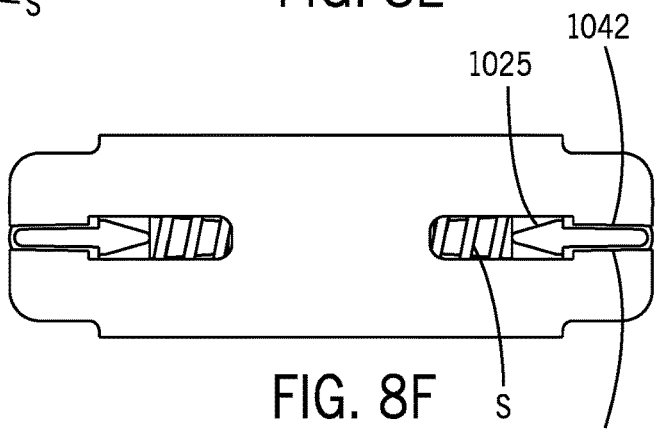
FIG. 8F
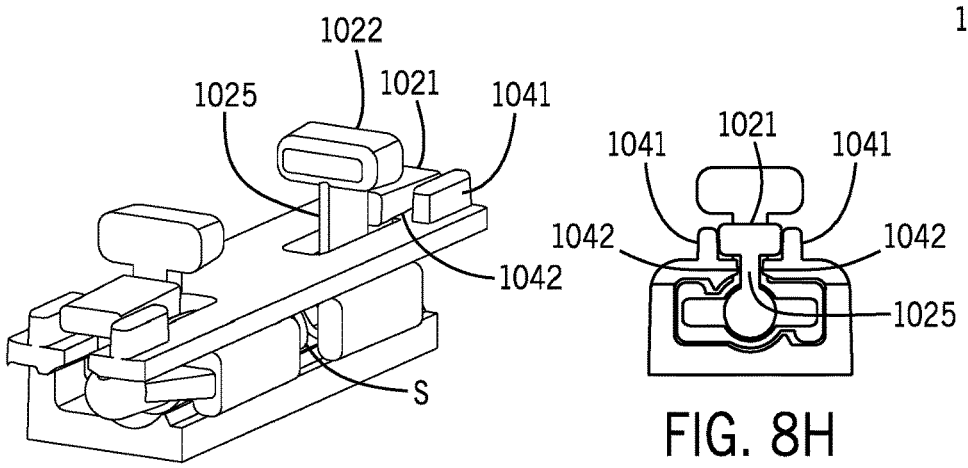
FIG. 8G
FIG. 8H
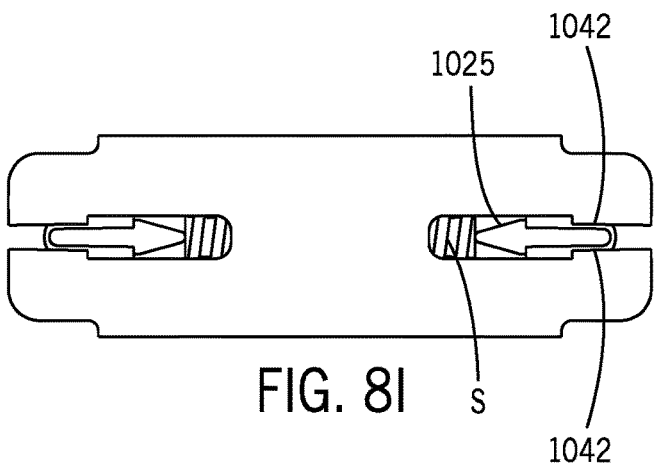
FIG. 8I

SWITCH MECHANISM FOR A VEHICLE INTERIOR COMPONENT

CROSS-REFERENCE TO RELATED APPLICATIONS

The present application is a continuation of International/PCT Patent Application No. PCT/US2017/024338 titled "MECHANISM FOR CONSOLE ASSEMBLY" filed Mar. 27, 2017, which claims the benefit of U.S. Provisional Patent Application Ser. No. 62/314,990 entitled "MECHANISM FOR CONSOLE ASSEMBLY" filed Mar. 30, 2016, and U.S. Provisional Patent Application Ser. No. 62/336,358 filed May 13, 2016 entitled "MECHANISM FOR CONSOLE ASSEMBLY."

The present application claims priority to and incorporates by reference in full the following patent applications: (a) U.S. Provisional Patent Application No. 62/314,990 titled "MECHANISM FOR CONSOLE ASSEMBLY" filed Mar. 30, 2016; (b) U.S. Provisional Patent Application No. 62/336,358 titled "MECHANISM FOR CONSOLE ASSEMBLY" filed May 13, 2016; (c) International/PCT Patent Application No. PCT/US2017/024338 titled "MECHANISM FOR CONSOLE ASSEMBLY" filed Mar. 27, 2017.

FIELD

The present invention relates to a switch mechanism for a vehicle interior component.

BACKGROUND

It is known to provide a switch mechanism for a component for the interior of a vehicle (e.g. car, truck, etc.). It is also known to provide a button (e.g., switch, actuator, etc.) implemented by a switch mechanism, for example, a button/switch to open and close a roof (e.g. sun/moon roof) for the vehicle. For such a switch or actuator it is undesirable for the button/switch mechanism to feel loose and/or to wobble/wiggle.

It would be advantageous to provide an improved switch mechanism for a vehicle interior component. It would also be advantageous to provide an improved switch mechanism minimizing wobble/wiggle of the switch/button.

SUMMARY

The present invention relates to a switch mechanism for a vehicle interior component comprising a carrier, a slide configured to slide within the carrier, at least one pin configured to move within the slide to center the slide in the carrier and a spring configured to move the at least one pin within the slide. The at least one pin may comprise a feature configured to guide movement of the at least one pin relative to the slide. The feature may comprise a protrusion configured to move against the slide to guide movement of the at least one pin relative to the slide. The slide may comprise a rib; the protrusion may be configured to slide against the rib to guide movement of the at least one pin relative to the slide. The rib may comprise two ribs; the protrusion may move between the two ribs to guide movement of the at least one pin relative to the slide. The slide may comprise an opening; the spring may be contained within the opening; the rib may extend beyond the opening. The carrier may comprise a surface; the at least one pin may be configured to slide against the surface of the carrier; the rib may extend from the slide away from the surface of the carrier. The feature may comprise a first guide and a second guide; the slide may comprise a first wall and a second wall; the first guide may be configured to slide along the first wall and the second guide may be configured to slide along the second wall to guide movement of the at least one pin relative to the slide. The slide may comprise an opening; the spring may be provided within the opening; the first guide and the second guide may be provided within the opening; the first guide and the second guide may be separated by a distance greater than a diameter of the spring. The at least one pin may comprise a handle configured for movement to compress the spring. The switch mechanism may comprise an electrical circuit; the slide may be centered in the carrier to provide engagement of the electrical circuit. The slide may be configured (a) to move from a default position to a forward position, (b) to move from the forward position to the default position, (c) to move from the default position to a rearward position, (d) to move from the rearward position to the default position. The at least one pin may be configured to move between a first retracted position, an extended position, and a second retracted position; and the at least one pin may be configured to be in the extended position when the slide is in the default position. The slide may comprise a carriage; the carrier may comprise at least one of (a) a set of notches, (b) a set of guides; (c) a set of angled surfaces; the spring may be configured to bias the at least one pin against one of the set of notches, set of guides and set of angled surfaces. The vehicle interior component may be at least one of (a) a console; (b) an overhead console; (c) an actuator for a vehicle system; (d) an actuator for a sunroof; the at least one pin may be configured to move between a retracted position and an extended position to guide movement of the slide to operate at least one of (a) a movable roof, (b) a door of the vehicle; the spring may be configured to move the at least one pin to the extended position.

The present invention relates to a switch mechanism for a vehicle interior component comprising a carrier, a slide configured to slide within the carrier, at least one pin configured to move within the slide to center the slide in the carrier and a spring configured to move the at least one pin within the slide. The at least one pin may comprise a feature configured to guide movement of the at least one pin relative to the slide. The at least one pin may comprise a first pin and a second pin separated by the spring. The first pin may comprise a first feature configured to guide movement of the first pin relative to the slide and the second pin may comprise a second feature configured to guide movement of the second pin relative to the slide. The first feature and the second feature may be separated by a distance greater than a length of the spring. The first feature may comprise a first protrusion and the second feature may comprise a second protrusion; the slide may comprise a first set of ribs and a second set of ribs; the first protrusion may move within the first set of ribs and the second protrusion may move within the second set of ribs to guide movement of the first and second pins relative to the slide. The first set of ribs and the second set of ribs may be separated by a distance greater than the length of the spring.

The present invention relates to a switch mechanism for a vehicle interior component comprising a carrier, a slide configured to slide within the carrier, at least one pin configured to move within the slide to center the slide in the carrier and a spring configured to move the at least one pin within the slide. The at least one pin may comprise a feature configured to guide movement of the at least one pin relative to the slide. The slide may comprise a wall comprising a first slot; the at least one pin may be configured to move within the first slot of the wall of the slide. The wall of the slide may comprise a second slot configured for assembly of the at least one pin to the slide. The second slot may be configured to prevent movement of the at least one pin relative to the slide. The at least one pin may comprise a wedge configured to slide within the second slot for assembly of the at least one pin to the slide; the wedge may be configured to prevent movement of the at least one pin within the second slot after assembly of the at least one pin with the slide. The slide may comprise a carriage; the carrier may comprise at least one of (a) opposed notches, (b) opposed guides; (c) opposed angled surfaces; the spring may be configured to bias the at least one pin against one of the opposed notches, opposed guides and opposed angled surfaces.

The present invention relates to a switch for a vehicle interior component comprising a carrier, a slide configured to slide within the carrier and at least one guide mechanism for the slide configured for an engaged state to guide movement of the slide within the carrier. The at least one guide mechanism may comprise at least one member configured to move relative to the slide to an extended position to provide the engaged state for the slide relative to the carrier and a spring configured to bias the at least one member to the extended position relative to the slide. The at least one member may comprise at least one feature configured to engage the slide. The slide may comprise at least one opening configured for the at least one member; the at least one member may comprise a body configured to move within the opening. The at least one feature of the least one member may comprise a set of flanges configured to fit within the at least one opening of the slide. The at least one opening of the slide may comprise a set of tracks for the set of flanges of the at least one member. The at least one opening of the slide may comprise at least one slot configured to engage the at least one member; the at least one feature of the at least one member configured to engage the slide may comprise a projection from the body of the at least one member configured to fit within the at least one slot of the slide. The projection of the at least one member may comprise a head configured to retain the at least one member within the at least one slot of the slide. The slot of the slide may comprise a set of guides for the head of the at least one member. The at least one opening of the slide may comprise an opening and a slot; the at least one feature of the at least one member configured to engage the slide may comprise a projection; the body of the at least one member may be configured to move within the opening of the slide; the projection of the at least one member may be configured to move within the slot of the slide. The at least one member may comprise a seat for the spring. The at least one guide mechanism for the slide may comprise a dual guide mechanism; the at least one member may comprise a first member comprising a seat for the spring and a second member comprising a seat for the spring; the spring of the dual guide mechanism may be configured between the first member and the second member to bias the first member away from the second member to provide the extended position and the engaged state for the slide relative to the carrier. The at least one guide mechanism for the slide may comprise a guide mechanism at each end of the slide. The at least one guide mechanism for the slide may comprise a dual guide mechanism at each end of the slide. The at least one guide mechanism may comprise a detent mechanism; the at least one member of the detent mechanism may be configured to move relative to the slide between (1) the extended position to provide the engaged state for the slide relative to the carrier and (2) a retracted position to provide a disengaged state for the slide relative to the carrier. The switch may comprise a button for the slide. The vehicle interior component may be at least one of (a) a console; (b) an overhead console; (c) an actuator for a vehicle system; (d) an actuator for a sunroof.

The present invention relates to a mechanism for a vehicle interior. The mechanism may comprise a carrier, a slide configured to slide within the carrier, at least one pin configured to move within the slide to center the slide in the carrier, and a spring configured to move the pin within the slide. The pin may comprise a feature to guide movement of the pin relative to the slide. The feature may comprise a protrusion configured to move against the slide to guide movement of the pin relative to the slide. The slide may comprise a rib and the protrusion may be configured to slide against the rib to guide movement of the pin relative to the slide. The rib may comprise two ribs and the protrusion may be configured to move between the two ribs to guide movement of the pin relative to the slide. The slide may comprise an opening extending into the slide and containing the spring and the rib or ribs may extend beyond the opening of the slide. The carrier may comprise a surface and the pin may be configured to slide against the surface when the slide moves within the carrier. The rib or ribs on the slide may be configured to extent from the slide (a) above, (b) below or (c) away from the surface of the carrier.

The present invention further relates to a mechanism for a vehicle interior. The mechanism may comprise a carrier, a slide configured to slide within the carrier, a first pin and a second pin, each configured to move within the slide to center the slide in the carrier, and a spring configured to move the first and second pins within the slide. The first and second pins may be spaced apart by the spring. The first pin may comprise a first feature to guide movement of the first pin relative to the slide and the second pin may comprise a second feature to guide movement of the second pin relative to the slide. The first feature and the second feature may be spaced apart from one another by a distance greater than a length of the spring when the spring and the first and second pins are installed in the slide. The first feature may comprise a first protrusion and the second feature may comprise a second protrusion. The slide may comprise a first set of ribs corresponding to the first protrusion and a second set of ribs corresponding to the second protrusion. The first protrusion may move within the first set of ribs and the second protrusion may move within the second set of ribs to guide movement of the first and second pins relative to the slide. The first set of ribs and the second set of ribs may be spaced apart by a distance greater than the length of the spring when the spring and the first and second pins are installed in the slide.

The present invention further relates to a mechanism where the feature for the pin may comprise a first guide and a second guide provided on the pin. The slide may comprise a first wall and a second wall. The first guide may be configured to slide against the first wall and the second guide may be configured to slide against the second wall to guide movement of the pin relative to the slide. The slide may comprise an opening for housing the spring and the first and second guides may be contained within the opening. The first and the second guides may be spaced apart by a distance greater than the diameter of the spring.

The present invention further relates to a mechanism for a vehicle interior where the slide may comprise a wall comprising a first slot where the pin is configured to move within the first slot of the wall of the slide. The wall may further comprise a second slot configured for assembly of the pin to the slide. The second slot may be configured to prevent movement of the pin relative to the slide. The pin may comprise a wedge configured to slide within the second slot for assembly of the pin to the slide where the wedge is configured to prevent movement of the pin within the second slot after assembly of the pin with the slide.

The present invention further relates to a mechanism for a vehicle interior where the pin may comprise a handle configured to compress the spring within the slide.

The present invention further relates to a mechanism for a vehicle interior where the pin may be configured to move between a retracted position and an extended position to operate at least one of (a) a movable roof, (b) a door of the vehicle where the spring may be configured to move the pin to the extended position. The mechanism may further comprise an electrical conductor and a circuit board comprising an electrical contact surface. The electrical conductor may be configured to engage with the electrical contact surface of the circuit board. The slide may be centered in the carrier to provide engagement of the electrical conductor and the electrical contact surface of the circuit board. The slide may be configured (a) to move from a default position to a forward position, (b) to move from the forward position to the default position, (c) to move from the default position to a rearward position, (d) to move from the rearward position to the default position. The pin may be configured to move between a first retracted position, an extended position, and a second retracted position where the pin may be configured to be in the extended position when the slide is in the default position.

The present invention further relates to a mechanism for a vehicle interior where the mechanism comprises a switch, the slide comprises a carriage, the carrier comprises at least one of (a) opposed notches, (b) opposed detents; (c) opposed angled surfaces, and the spring may be configured to bias the at least one pin against one of the notches, detents, angled surfaces.

FIGURES

FIG. 3A is a schematic perspective exploded view of a switch mechanism for a vehicle interior component according to an exemplary embodiment.

FIG. 3B is a schematic perspective view of a pin of a switch mechanism for a vehicle interior component according to an exemplary embodiment.

FIG. 3C is a schematic perspective view of a slide of a switch mechanism for a vehicle interior component according to an exemplary embodiment.

FIGS. 5A to 5C are schematic perspective cut-away views of a switch mechanism for a vehicle interior component according to an exemplary embodiment.

FIGS. 5D to 5F are schematic side views of a switch mechanism for a vehicle interior component according to an exemplary embodiment.

FIG. 8D is a schematic perspective partial view of a sub-assembly of a switch mechanism for a vehicle interior component according to an exemplary embodiment.

FIG. 8E is a schematic section view of a sub-assembly of a switch mechanism for a vehicle interior component according to an exemplary embodiment.

FIG. 8F is a schematic section view of a sub-assembly of a switch mechanism for a vehicle interior component according to an exemplary embodiment.

FIG. 8G is a schematic perspective partial view of a sub-assembly of a switch mechanism for a vehicle interior component according to an exemplary embodiment.

FIG. 8H is a schematic section view of a sub-assembly of a switch mechanism for a vehicle interior component according to an exemplary embodiment.

FIG. 8I is a schematic section view of a sub-assembly of a switch mechanism for a vehicle interior component according to an exemplary embodiment.

DESCRIPTION

Figure 1A:
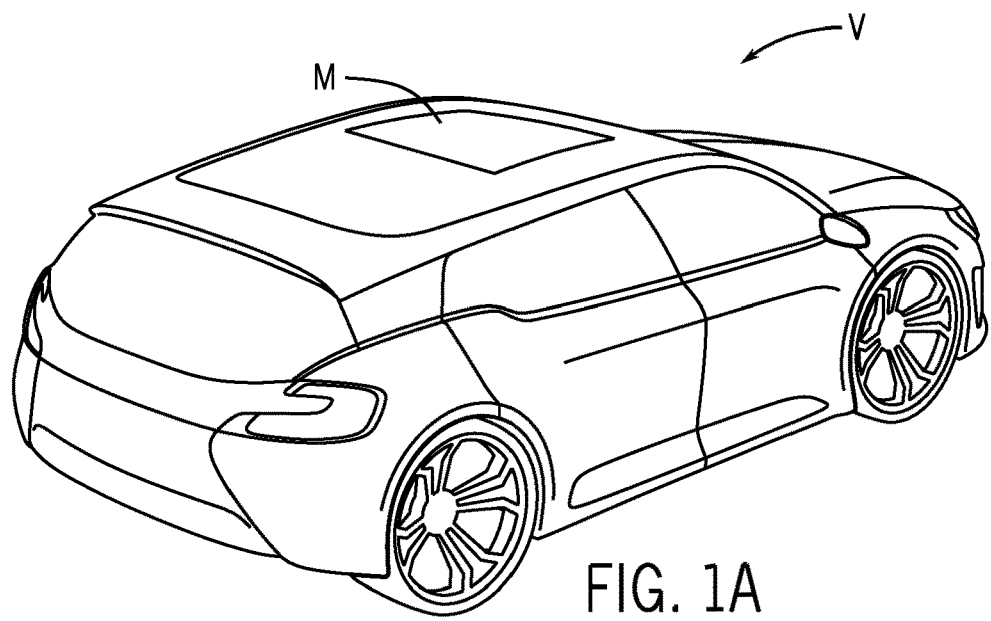
FIG. 1A is a schematic perspective view of a vehicle according to an exemplary embodiment.
Figure 1B:
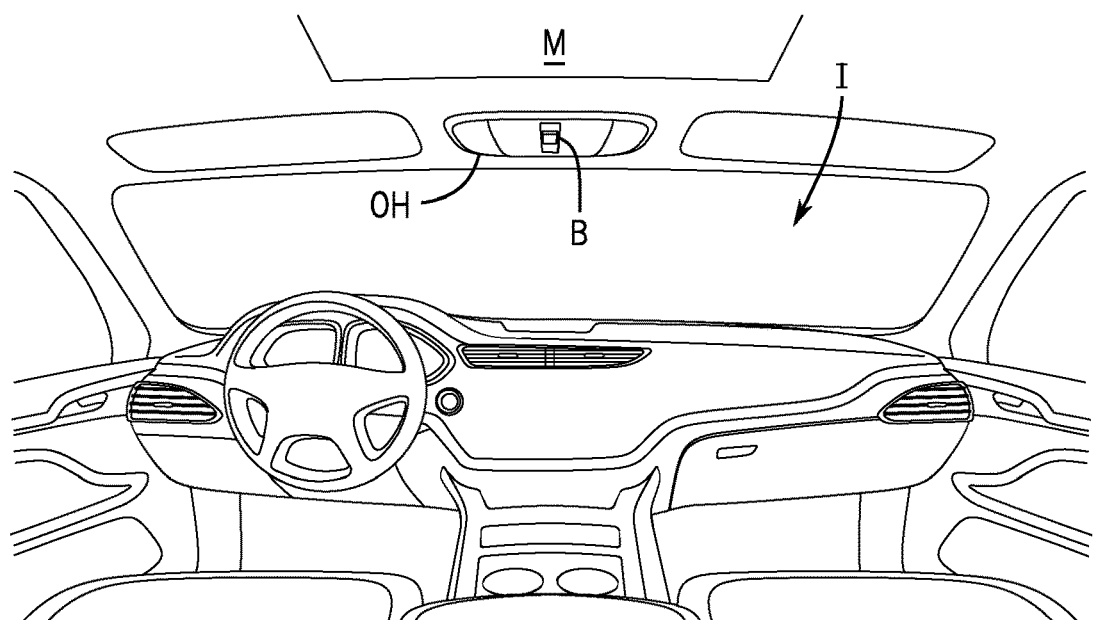
FIG. 1B is a schematic perspective view of a vehicle interior according to an exemplary embodiment.
Figure 1C:
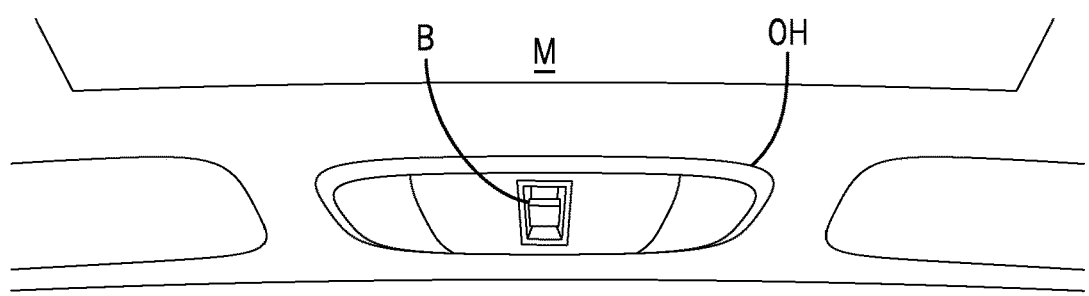
FIG. 1C is a schematic detail view of an overhead console assembly according to an exemplary embodiment.
Figure 2A:
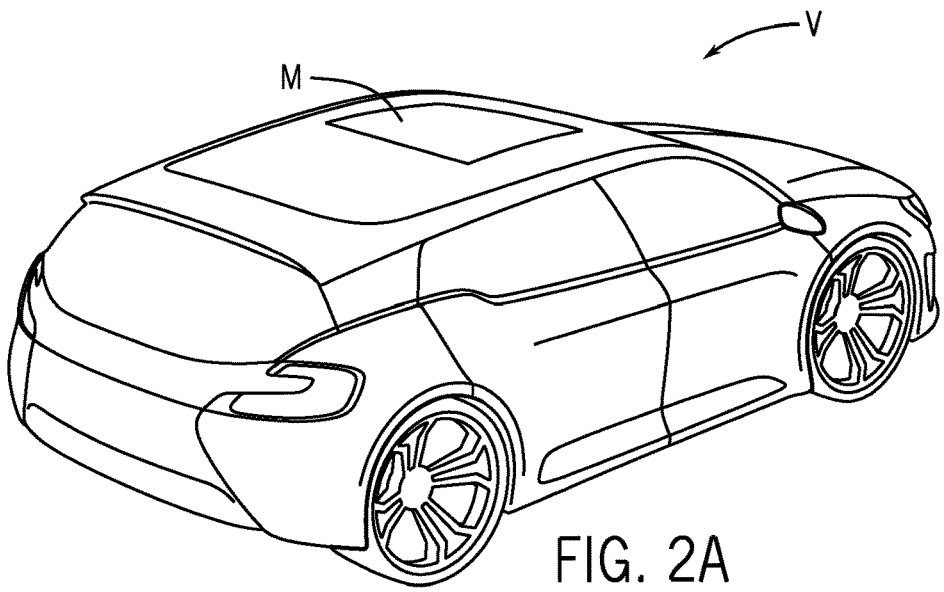
FIGS. 2A to 2C are schematic perspective views of a roof of a vehicle according to an exemplary embodiment.
Figure 2B:
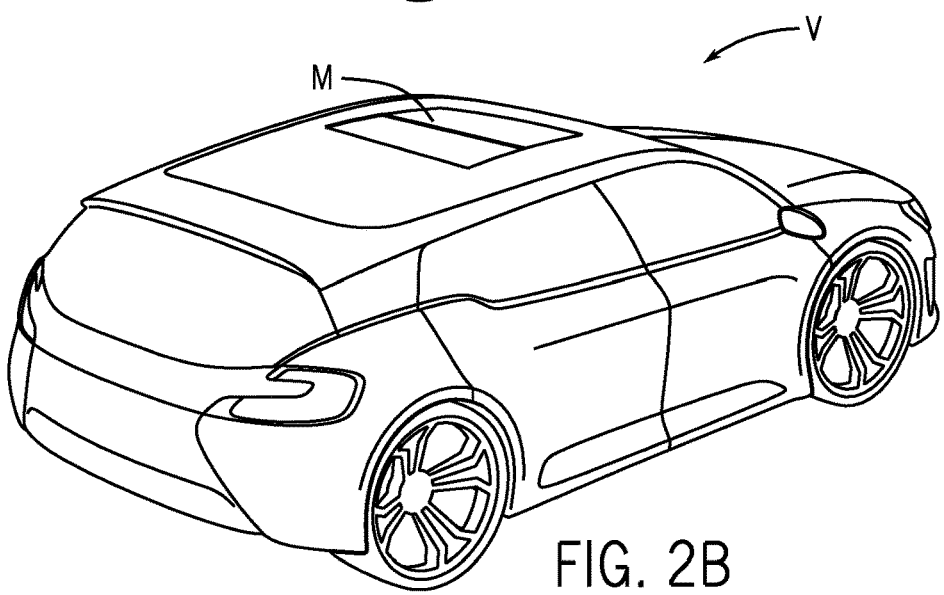
Figure 2C:
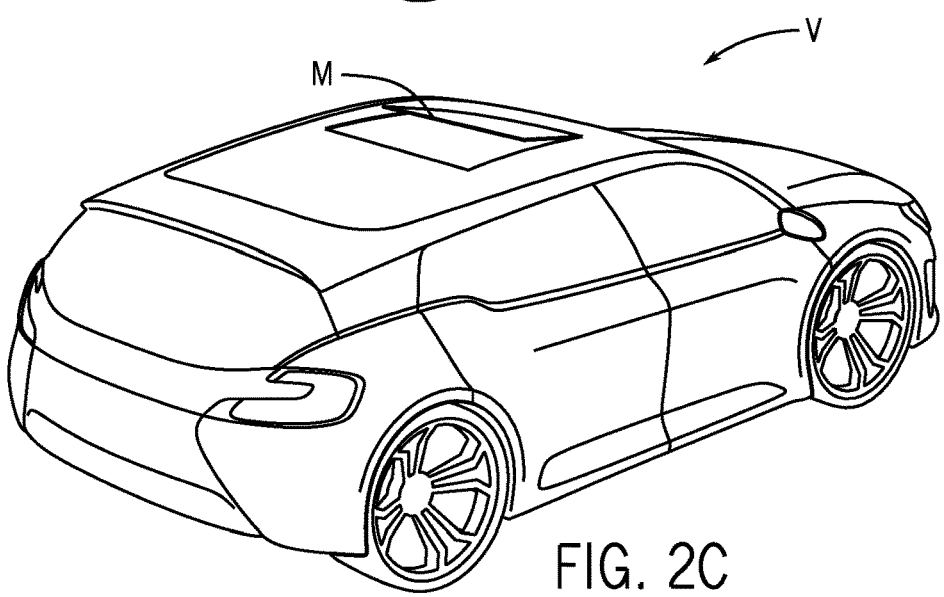

Referring to FIGS. 1A to 2C, a vehicle V is shown schematically including a vehicle interior I with a console shown as an overhead console OH according to an exemplary embodiment. According to an exemplary embodiment as shown schematically in FIGS. 1B and 1C, console OH may include a button B configured to operate a movable component of vehicle V, such as a window, mirror or roof. As shown schematically in FIGS. 1B and 1C, console OH may be configured as an overhead console; console OH may be positioned on a door, a center console, a dashboard, or other location within the interior I of vehicle V. According to an exemplary embodiment as shown schematically in FIGS. 1B and 1C, button B may slide in a forward direction and a backward direction, and button B may also be pushed in a vertical direction. According to an exemplary embodiment, movement of button B in the forward, backward or vertical direction may actuate the movable component of vehicle V.

As shown schematically in FIGS. 1A to 2C, vehicle V may include a roof that has a movable portion M (e.g., a sun roof or moon roof). According to an exemplary embodiment, button B provided on console OH may operate the movable portion M of the roof. As shown schematically in FIG. 2A, roof M is in a closed position; as shown schematically in FIG. 2B, roof M is in a partially opened position; as shown schematically in FIG. 2C, roof M is in a partially raised position. According to an exemplary embodiment, roof M may be actuated or moved between open and closed positions by sliding button B in the forward or backward direction or tilted upward or downward by pushing the button B in the vertical direction. According to an exemplary embodiment, button B may be configured as part of a switch or switch mechanism (See FIG. 3A) provided in console OH and configured to operate roof M.

According to an exemplary embodiment as shown schematically in FIGS. 3A-3C, 4A-4E, 5A-5F, 6A-6C, 7A-7C, 8A-8I and 9A-9C, a switch mechanism 100 for a vehicle interior component may comprise a carrier 120, a slide 104 configured to slide within carrier 120, at least one pin 102 configured to move within slide 104 to center slide 104 in carrier 120 and a spring S configured to move the at least one pin within slide 104. The at least one pin 102 may comprise a feature configured to guide movement of the at least one pin 102 relative to slide 104. The feature may comprise a protrusion 1021 configured to move against slide 104 to guide movement of the at least one pin 102 relative to slide 104 (see FIGS. 8D-8I). Slide 104 may comprise a rib 1041; protrusion 1021 may be configured to slide against rib 1041 to guide movement of the at least one pin 102 relative to slide 104 (see FIGS. 8D-8I). Rib 1041 may comprise two ribs; protrusion 1021 may move between the two ribs 1041 to guide movement of the at least one pin 102 relative to slide 104 (see FIGS. 8D-8I). Slide 104 may comprise an opening 1047; spring S may be contained within opening 1047; rib 1041 may extend beyond opening 1041 (see FIGS. 8B-8C). Carrier 120 may comprise a surface 1201; the at least one pin 102 may be configured to slide against surface 1201 of carrier 120 (see FIGS. 6A-8C and 7A-7C); rib 1041 may extend from slide 104 away from surface 1201 of carrier 120 (see FIGS. 8D and 8G). The feature may comprise a first guide 1024 and a second guide 1024; slide 104 may comprise a first wall 1048 and a second wall 1049; first guide 1024 may be configured to slide along first wall 1048 and second guide 1024 may be configured to slide along second wall 1049 to guide movement of the at least one pin 102 relative to slide 104 (see FIGS. 8A, 8D, 8E, 8G and 8H). Slide 104 may comprise an opening 1047; spring S may be provided within opening 1047; first guide 1024 and second guide 1024 may be provided within opening 1047; first guide 1024 and second guide 1024 may be separated by a distance greater than a diameter of spring S (see FIG. 8A). The at least one pin 102 may comprise a handle 1022 configured for movement to compress spring S (see FIGS. 8D-8I). Switch mechanism 100 may comprise an electrical circuit; slide 104 may be centered in carrier 120 to provide engagement of the electrical circuit. Slide 104 may be configured (a) to move from a default position to a forward position, (b) to move from the forward position to the default position, (c) to move from the default position to a rearward position, (d) to move from the rearward position to the default position (see FIGS. 6A-6C and 7A-7C). The at least one pin 102 may be configured to move between a first retracted position, an extended position, and a second retracted position; and the at least one pin 102 may be configured to be in the extended position when slide 104 is in the default position (see FIGS. 6A-6C). Slide 104 may comprise a carriage; carrier 120 may comprise at least one of (a) a set of notches, (b) a set of guides; (c) a set of angled surfaces; spring S may be configured to bias the at least one pin 102 against one of the set of notches, set of guides and set of angled surfaces (see FIGS. 6A-6C and 7A-7C). The vehicle interior component may be at least one of (a) a console; (b) an overhead console; (c) an actuator for a vehicle system; (d) an actuator for a sunroof; the at least one pin 102 may be configured to move between a retracted position and an extended position to guide movement of slide 104 to operate at least one of (a) a movable roof, (b) a door of the vehicle; spring S may be configured to move the at least one pin 102 to the extended position.

According to an exemplary embodiment as shown schematically in FIGS. 3A-3C, 4A-4E, 5A-5F, 6A-6C, 7A-7C, 8A-8I and 9A-9C, a switch mechanism 100 for a vehicle interior component may comprise a carrier 120, a slide 104 configured to slide within carrier 120, at least one pin 102 configured to move within slide 104 to center slide 104 in carrier 120 and a spring S configured to move the at least one pin within slide 104. The at least one pin 102 may comprise a feature configured to guide movement of the at least one pin 102 relative to slide 104. The at least one pin 102 may comprise a first pin 102 and a second pin 102 separated by spring S. First pin 102 may comprise a first feature 1021 configured to guide movement of first pin 102 relative to slide 104 and second pin 102 may comprise a second feature 1021 configured to guide movement of second pin 102 relative to slide 104 (see FIGS. 8D-8I). First feature 1021 and second feature 1021 may be separated by a distance greater than a length of spring S (see FIGS. 8A and 8B). First feature 1021 may comprise a first protrusion and second feature 1021 may comprise a second protrusion; slide 104 may comprise a first set of ribs 1041 and a second set of ribs 1041; first protrusion 1021 may move within first set of ribs 1041 and second protrusion 1021 may move within second set of ribs 1041 to guide movement of first and second pins 102 relative to slide 104 (see FIGS. 8D-8I). First set of ribs 1041 and second set of ribs 1041 may be separated by a distance greater than the length of spring S (see FIGS. 8A and 8B).

According to an exemplary embodiment as shown schematically in FIGS. 3A-3C, 4A-4E, 5A-5F, 6A-6C, 7A-7C, 8A-8I and 9A-9C, a switch mechanism 100 for a vehicle interior component may comprise a carrier 120, a slide 104 configured to slide within carrier 120, at least one pin 102 configured to move within slide 104 to center slide 104 in carrier 120 and a spring S configured to move the at least one pin within slide 104. The at least one pin 102 may comprise a feature configured to guide movement of the at least one pin 102 relative to slide 104. Slide 104 may comprise a wall 1044 comprising a first slot 1045; the at least one pin 102 may be configured to move within first slot 1045 of wall 1044 of slide 104. Wall 1044 of slide 104 may comprise a second slot 1046 configured for assembly of the at least one pin 102 to slide 104. Second slot 1046 may be configured to prevent movement of the at least one pin 102 relative to slide 104. The at least one pin 102 may comprise a wedge 1025 configured to slide within second slot 1046 for assembly of the at least one pin 102 to slide 104; wedge 1025 may be configured to prevent movement of the at least one pin 102 within second slot 1046 after assembly of the at least one pin 102 with slide 104. Slide 104 may comprise a carriage;

carrier 120 may comprise at least one of (a) opposed notches 1201, (b) opposed guides 1201; (c) opposed angled surfaces 1201; spring S may be configured to bias the at least one pin 102 against one of the opposed notches 1201, opposed guides 1201 and opposed angled surfaces 1201.

According to an exemplary embodiment as shown schematically in FIG. 3A, switch or switch mechanism 100 may comprise a circuit board shown as a printed circuit board 106 having an electrical contact surface, a carriage or slide 104, a cover portion or carrier 120, a base 122 and button B. Slide 104 may be configured to slide within carrier 120. Slide 104 may move laterally within carrier 120 in both a forward and a backward direction. Switch mechanism 100 may comprise at least one pin or detent pin 102 and a spring S configured to allow and restrict the lateral movement of slide 104 within carrier 120. The at least one pin 102 may be configured to move within slide 104 to center slide 104 in carrier 120. Spring S may be configured to move the at least one pin 102 within slide 104. As shown schematically in FIG. 3B, the at least one pin 102 may comprise one or more features provided as a protrusion 1021 and guides 1024 configured to stabilize the at least one pin 102 relative to slide 104 and carrier 120 and prevent or limit wiggling or wobbling of the at least one pin 102.

Figure 8A:
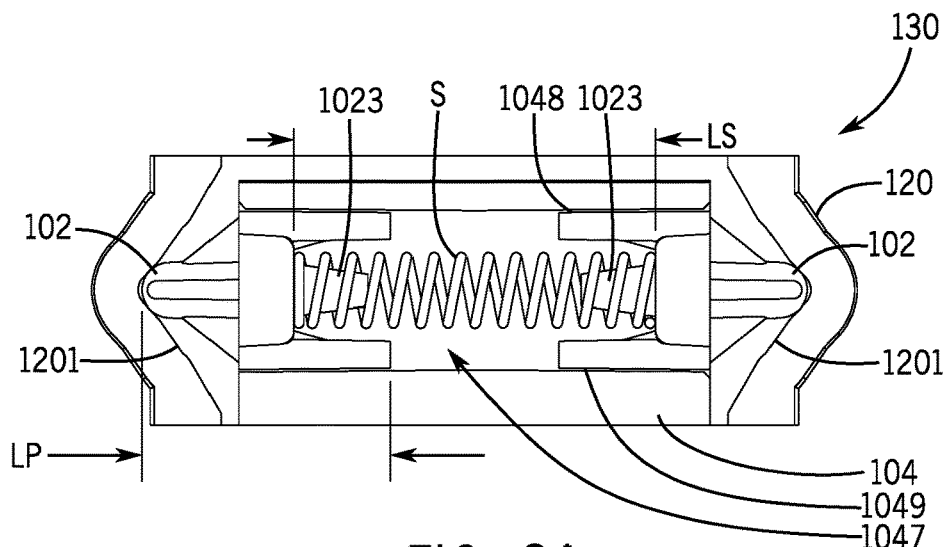
FIG. 8A is a schematic cross-section top view of a sub-assembly of a switch mechanism for a vehicle interior component according to an exemplary embodiment.
Figure 8B:
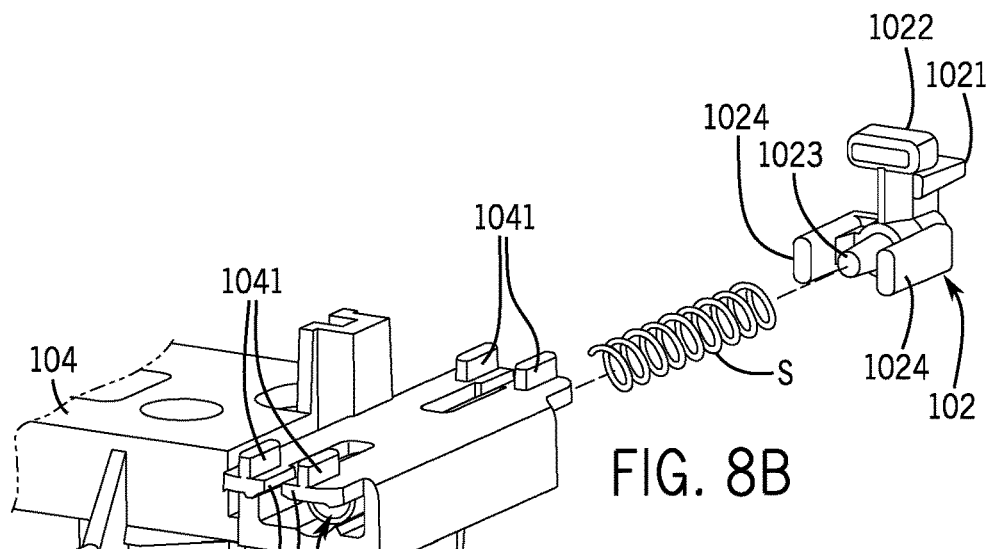
FIG. 8B is a schematic perspective exploded partial view of a sub-assembly of a switch mechanism for a vehicle interior component according to an exemplary embodiment.

According to an exemplary embodiment as shown schematically in FIGS. 3A, 3C and 8B, slide 104 may include an opening 1047 for receiving spring S. The at least one pin 102 may be configured to receive and constrain spring S within opening 1047. Opening 1047 may be configured as a slot, channel, housing or similar structure extending into a body of slide 104. As shown schematically in FIGS. 3A and 8B, switch mechanism 100 may comprise two pins 102 provided on each side of slide 104 and a spring S provided in opening 1047 extending through slide 104 between both pins 102. As shown schematically in FIGS. 3A, 8B and 8C, pins 102 may be configured to slide within slide 104 when there is compression and/or expansion of spring S within slide 104. Pins 102 may be configured to compress and/or constrain spring S within slide 104.

According to an exemplary embodiment, carrier 120 may include a surface 1201 configured as a sloped surface, a notch, a detent, an indentation and/or an angled surface corresponding to each pin 102. As shown schematically in FIG. 3A, carrier 120 may include two opposing surfaces 1201 provided on sides of carrier 120. As shown schematically in FIG. 3A, each surface 1201 may comprise a generally v-shaped sloped surface forming a notch at the deepest part of the sloped surface 1201 and a raised portion at the angled part of the sloped surface 1201. The ends of pins 102 may be configured to slide against surface 1201 and be biased toward the deepest part or notch of the v-shaped sloped surface 1201. Spring S may be configured to urge pins 102 outward and bias pins 102 against surface 1201.

According to an exemplary embodiment as shown schematically in FIG. 3A, switch mechanism 100 may further comprise an electrical conductor shown as a stamping 108 that may be attached to slide 104 and configured to complete electric circuits on circuit board 106 by contacting the electrical contact surface on circuit board 106.

According to an exemplary embodiment as shown schematically in FIG. 3A, switch mechanism 100 may comprise a dome 112; dome 112 may comprise one or more electrical conductors shown as contact members, projections, inserts or pills 116. Pills 116 may comprise any material with electrical conductivity, such as carbon. Pills 116 may be configured to fit through holes 1043 on slide 104 to complete an electrical circuit on circuit board 106. As shown schematically in FIG. 3A, mechanism 100 may comprise a stalk 114 configured to attach dome 112 to slide 104. Button B may be secured to stalk 114 and connect button B to slide 104. Slide 104, pins 102, spring S, stalk 114, dome 116 and button B may be connected to form a sub-assembly 110 positioned within carrier 120. Sub-assembly 110 may be configured to slide relative to carrier 120 in order to operate switch mechanism 100.

According to an exemplary embodiment as shown schematically in FIG. 3A, base 122 may include an opening 1221; button B may be positioned at least partially through opening 1221 and attached to stalk 114 to engage and actuate slide 104. Base 122 may be configured to allow button B to slide in both a forward and a backward direction to allow button B to move slide 104 in a forward and backward direction within carrier 120 to operate switch mechanism 100. According to an exemplary embodiment, the underside of base 122 may provide a visible surface to occupants of vehicle V and mechanical parts of switch mechanism 100 may be hidden from view of the vehicle occupants.

According to an exemplary embodiment as shown schematically in 3A, 4A-4E and 5A-5F, a console OH may be configured with a switch mechanism 100. Switch mechanism 100 may comprise a circuit board 106, a sub-assembly 110, an electrical stamping 108 provided between and electrically connecting circuit board 106 and sub-assembly 110, a carrier 120 configured to hold sub-assembly 110 and a base 122. Sub-assembly 110 may comprise a slide 104 with an opening 1047 (see FIGS. 3A and 8B) for receiving a spring S and two detent pins 102, a dome 112 and a stalk 114 connected to slide 104, and a button connected to stalk 114.

According to an exemplary embodiment, circuit board 106 may be mounted, fixed or otherwise secured to the console OH and may be positioned as the top surface of switch mechanism 100; carrier 120 may be positioned over circuit board 106 and fixed in place; base 122 may positioned as the bottom surface of switch mechanism 100. Sub-assembly 110 may be positioned within carrier 120 and configured for movement in a forward direction, a backward direction and a vertical direction; the forward, backward and vertical movements may operate to complete the circuit between circuit board 106 and electrical stamping 108. Pins 102 may be pressed against and slide across sloped surfaces 1201 on each side of carrier 120 when moving in the forward and backward directions. Button B may be accessible from base 122 to an occupant of the vehicle V to operate switch mechanism 100 by moving button B in a forward or backward direction or pressing on button B. See FIGS. 4A to 4E and 5A to 5F. As shown schematically in FIGS. 4A to 4E and 5A to 5F, the forward, backward or vertical movement of button B may actuate a movable component of vehicle V (e.g., roof M or a door or window of vehicle V).

According to an exemplary embodiment, the at least one pin 102 may be configured to move between a retracted position (where pin 102 is located at the angled portion of sloped surface 1201 of carrier 120 and fully depressed into slide 104) and an extended position (where pin 102 is located at the deepest notch part of sloped surface 1021 and partially depressed into slide 104). See FIGS. 6A to 6C. According to an exemplary embodiment, spring S may be compressed within slide 104 and configured to provide an outward force on the at least one pin 102 to bias pin 102 into the extended position. The movement of pin 102 between the extended position and the retracted position may correspond to movement of slide 104 within carrier 120 to operate the movable component of vehicle V (e.g., movable roof M, a door of vehicle V, a window of vehicle C or other component of vehicle V).

According to an exemplary embodiment, slide 104 may be configured to move between a default position (where pin 102 is in the extended position and located at the deepest part of sloped surface 1201) and a forward position (where pin 102 is in a first retracted position and located at the angled portion on one end of sloped surface 1201) or rearward position (where pin 102 is in a second retracted position and located at the angled portion on the opposing end of sloped surface 1201); the movement of slide 104 between the default, forward and rearward positions may be operated by movement of button B. See FIGS. 6A to 6C. According to an exemplary embodiment, slide 104 may be centered in carrier 120 to provide engagement of electrical conductor 108 and the electrical contact surface of circuit board 106. Electrical conductor 108 may engage circuit board 106 to complete the circuit when slide 104 is moved to the forward or rearward positions.

As shown schematically in FIG. 3B, pin 102 may comprise a wedge 1025, a core 1023 configured to be positioned within one end of spring S, a rounded end 1026 opposite core 1023 and a handle 1022 provided on an upper end of wedge 1025. As shown schematically in FIG. 3A, core 1023 may be inserted into an opening located at an end of spring S. According to an exemplary embodiment, core 1023 need not be configured to operate as a functional interface between pin 102 and spring S or engage spring S when pin 102 and spring S are installed on slide 104. Handle 1022 may be provided to allow for easier installation of pin 102 onto slide 104 and to compress spring S. Rounded end 1026 may be configured to engage and slide along sloped surface 1201 of carrier 120. As shown schematically in FIG. 3B, pin 102 may comprise a feature configured as at least one guide 1024 extending in an opposite direction of rounded end 1026. According to an exemplary embodiment, the feature may be configured as a pair of guides 1024 extending along each side of core 1023. According to an exemplary embodiment, guides 1024 may be configured to slide within a slot or opening 1047 provided through slide 104 and guide the movement of pin 102 within opening 1047. See FIGS. 9A to 9C. Guides 1024 may be configured to reduce and minimize the wobble/wiggle of pins 102 in opening 1047 during movement of slide 104 relative to carrier 120.

According to an exemplary embodiment as shown schematically in FIG. 3B, pin 102 may comprise a feature configured as a protrusion 1021 to guide movement of pin 102 relative to slide 104. Protrusion 1021 may extend away from wedge 1025 and core 1023. As shown schematically in FIG. 3B, protrusion 1021 may be positioned on a side of wedge 1025 opposite core 1023 and guides 1024. Protrusion 1021 may be positioned between ribs 1041 provided on slide 104. Protrusion 1021 may slide between ribs 1041 provided on slide 104. Protrusion 1021 may be configured to stabilize pin 102 and reduce and minimize the wobble/wiggle of pin 102 in opening 1047 during movement. See FIGS. 9A to 9C.

According to an exemplary embodiment as shown schematically in FIG. 3C, slide 104 may comprise a slot, housing or opening 1047 configured to allow spring S to extend through slide 104. Guides 1024 of pin 102 may slide within opening 1047. Slide 104 may include a top wall 1044 provided above opening 1047. As shown schematically in FIG. 3C, slide 104 may include a slot 1045 extending inward along top wall 1044 from each end of slide 104. Slide 104 may include a first slot 1045 extending from the ends of slide 104 and along wall 1044 and a second slot 1046 extending from the ends of slide 104 and along at least a part of the length of first slot 1045. Second slot 1046 may have a width less than the width of first slot 1045. Slots 1045 and 1046 may be configured to allow pins 102 to be inserted into opening 1047 of slide 104 and hold spring S within slide 104. Wedge 1025 may slide within slots 1045 and 1046.

According to an exemplary embodiment as shown schematically in FIG. 3C, second slot 1046 may provide one or more ledges 1042 along wall 1044; ledges 1042 may be provided by the reduced width of second slot 1046. Second slot 1046 may be configured to prevent movement of pin 102 relative to slide 104. Second slot 1046 may be configured to receive wedge 1025 of pin 102 and allow wedge 1025 to slide through second slot 1046 and into first slot 1045 for assembly of pin 102 to slide 104. Wedge 1025 may be configured to slide through second slot 1046 and into first slot 1045 for assembly of pin 102 to slide 104 and be prevented from entering second slot 1046; ledges 1042 provided on each side of second slot 1046 may restrict wedge 1025 from sliding backward into second slot 1046 after assembly of pin 102 to slide 104.

According to an exemplary embodiment as shown schematically in FIG. 3C, slide 104 may include a rib 1041 configured to engage protrusion 1021 of pin 102 and allow protrusion 1021 to slide against rib 1041 to guide movement of pin 102 relative to slide 104. As shown schematically in FIG. 3C, rib 1041 may extend beyond opening 1047 of slide 104. Rib 1041 may extend from slide 104 above, below or away from the surface of carrier 120.

According to an exemplary embodiment, slide 104 may include two ribs 1041 provided on wall 1044 along each side of slots 1046. Ribs 1041 may be configured to receive and contain protrusion 1021 of pins 102 when pin 102 slides within opening 1047 of slide 104. See FIG. 8C. According to an exemplary embodiment, ribs 1041 may be configured to allow protrusion 1021 of pin 102 to move between ribs 1041 to guide movement of pin 102 relative to slide 104.

According to an exemplary embodiment as shown schematically in FIGS. 4A-4E, switch mechanism 100 may be operated by moving button B to control movement of roof M (or other movable component of vehicle V configured to be controlled by switch mechanism). As shown schematically in FIG. 4A, slide 104 may be at a default position with no contact at button B; spring S may be compressed between pins 102 (see FIGS. 3A and 8A) (e.g., tending to push pins 102 toward an extended position against surfaces 1201). Spring S may be configured to maintain/keep slide 104 centered within carrier 120 (e.g., to reduce/eliminate side to side shift of slide 104 within carrier 120); slide 104 may be configured to provide accurate and consistent electrical contact between electrical stamping 108 and circuit board 106. According to an exemplary embodiment, carrier 120 may include sloped surfaces 1201 configured as v-shaped notches with ramped surfaces (see FIGS. 6A and 8A) to facilitate movement of pins 102 between an extended position where pins 102 are located at the deepest part of sloped surfaces 1201 (see FIGS. 6B and 6C) and a retracted position where pins 102 are located along the angled part of sloped surfaces 1021 (see FIG. 6A).

Figure 4A:
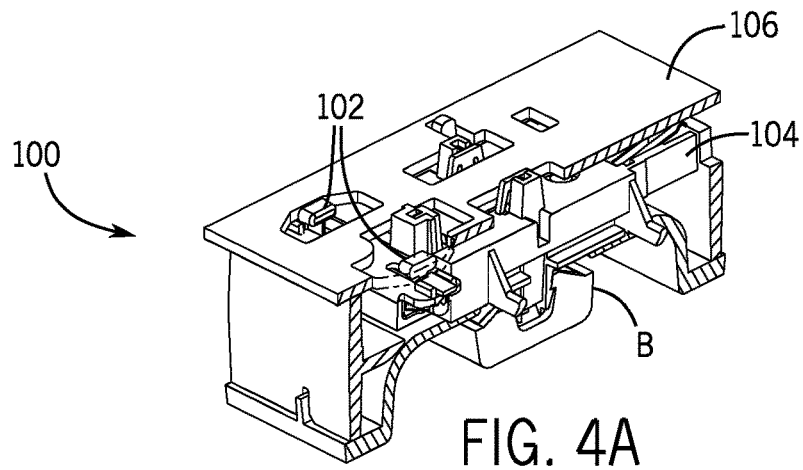
FIGS. 4A to 4E are schematic perspective cut-away views of a switch mechanism for a vehicle interior component according to an exemplary embodiment.
Figure 4B:
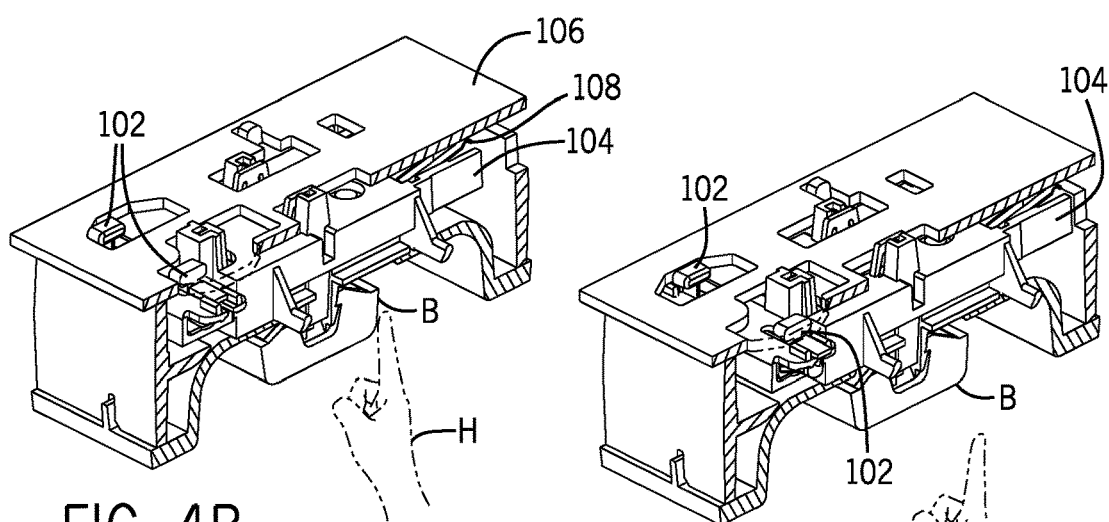

According to an exemplary embodiment as shown schematically in FIG. 4B, button B may be pushed (e.g., by a finger of an occupant's hand H) in a forward direction; pins 102 may slide along sloped surfaces 1201 of carrier 120 and move to a first retracted position and slide 104 may move to a forward position to actuate forward movement of roof M (e.g., through conductor/stamping 108 in contact with circuit board 106). See FIGS. 2B and 6B.

Figure 4C:
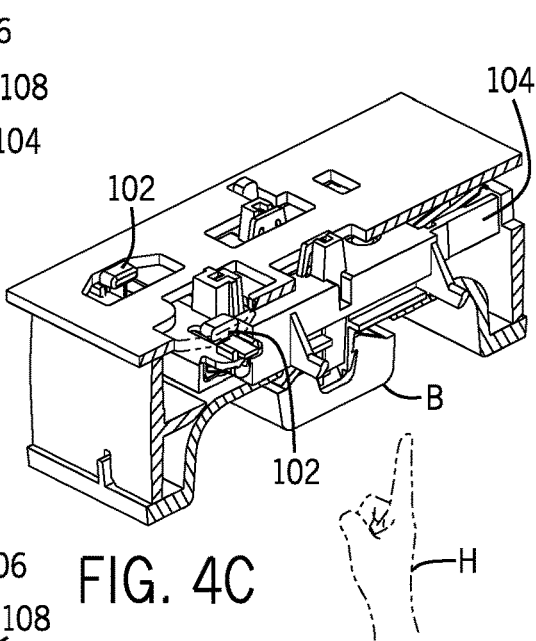

According to an exemplary embodiment as shown schematically in FIG. 4C, hand H may be released from button B; button B may return to the default position as pins 102 slide back along sloped surfaces 1201 of carrier 120 to the extended position as a result of spring S. When button B returns to the default position, roof M may be no longer actuated, with stamping 108 being disengaged from circuit board 106. See also FIG. 2B.

Figure 4D:
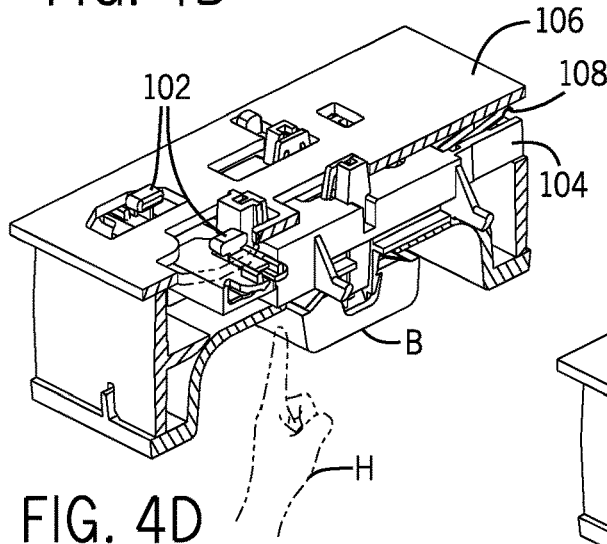

According to an exemplary embodiment as shown schematically in FIG. 4D, button B may be pushed (e.g., by the finger of occupant's hand H) in a backward direction; pins 102 may slide along sloped surfaces 1201 of carrier 120 and move to a second retracted position and slide 104 may move to a backward position to actuate rearward movement of roof M (e.g., through stamping 108 in contact with circuit board 106). See FIGS. 2B and 6C.

Figure 4E:
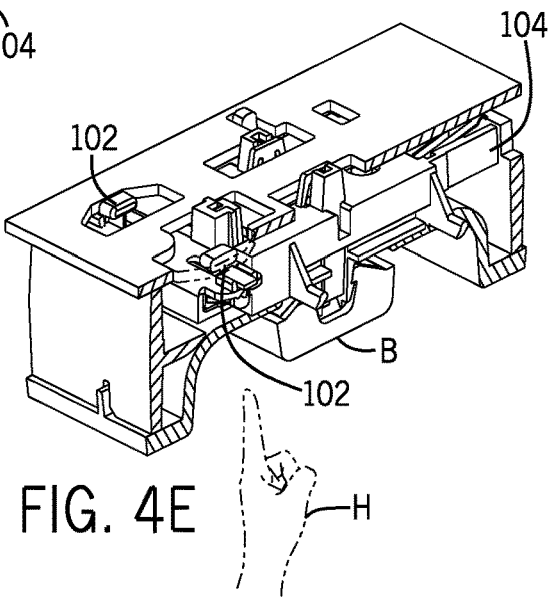

According to an exemplary embodiment as shown schematically in FIG. 4E, hand H may be released from button B; button B may return to the default position as pins 102 slide back along sloped surfaces 1201 of carrier 120 to the extended position and roof M may no longer be actuated, with stamping 108 being disengaged from circuit board 106.

According to an exemplary embodiment as shown schematically in FIGS. 5A and 5D, button B may be in the default position when no force is being applied (e.g., by a finger of occupant's hand); slide 104 may be in the default position and pins 102 may be in the extended position and located within the deepest part of sloped surfaces 1201 provided on carrier 120. When slide 104 is in the default position, the contacts/pills 116 may not be in contact with circuit board 106. As shown schematically in FIGS. 5B and 5E, button B may be pushed in a vertical or upward direction by applying a force to button B (e.g., by a finger of occupant's hand H). When button B is pushed, stalk 114 and dome 112 may move relative to slide 104 and contacts/pills 116 of dome 112 may move through holes 1043 provided on slide 104 and contact circuit board 106 to complete the electric circuit. When the electric circuit is completed by pushing button relative to base 122 and carrier 120, the completed electrical circuit may cause tilting movement of roof M. See FIG. 2C.

According to an exemplary embodiment as shown schematically in FIGS. 5C and 5F, when the force applied to push button B is removed from button B (e.g., by the occupant moving his/her hand H away from button B), stalk 114 and dome 112 may move and return to the default position; contacts/pills 116 may disengage from circuit board 106 and the completed circuit may be broken to cease the tilting movement of roof M.

Figure 6A:
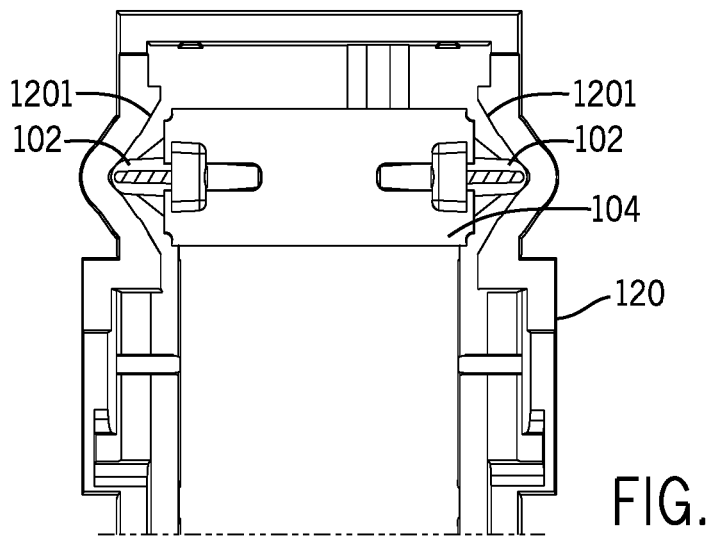
FIGS. 6A to 6C are schematic partial top views of a switch mechanism for a vehicle interior component according to an exemplary embodiment.
Figure 6B:
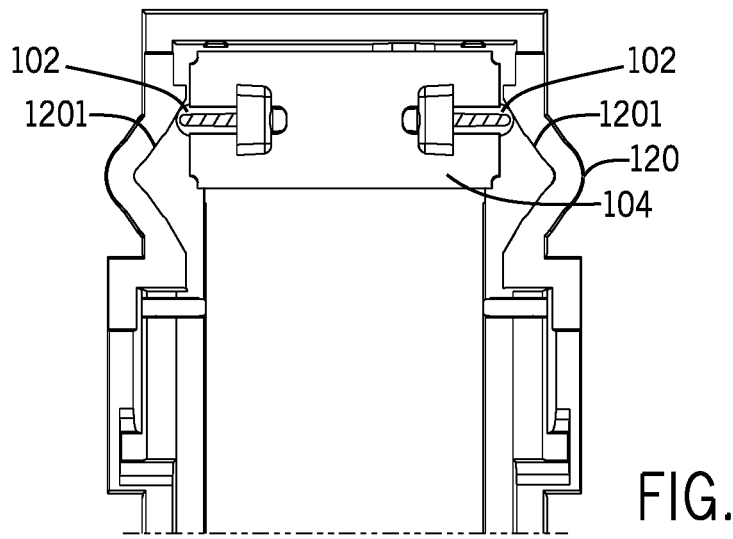
Figure 6C:
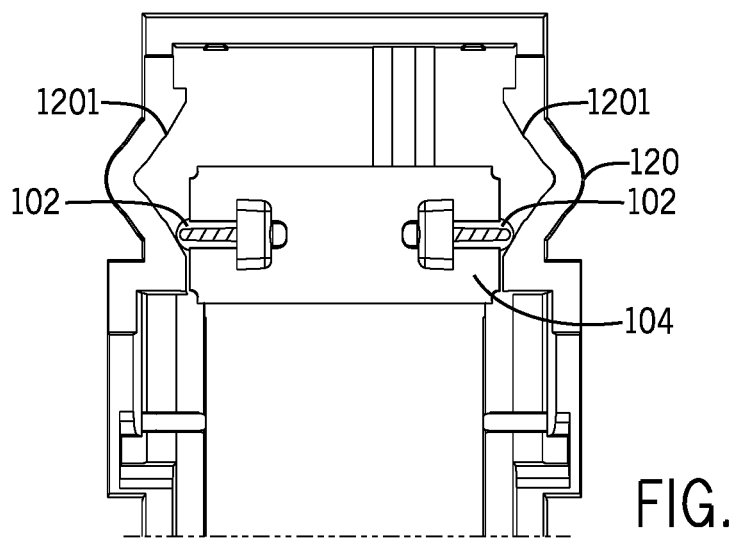

FIGS. 6A to 6C show schematically the position and movement of slide 104 and pins 102 relative to carrier 140 when button B is moved in a forward or backward direction (see FIGS. 4A to 4E) according to an exemplary embodiment. As shown schematically in FIG. 6A, slide 104 may be in the default position within carrier 120 and electrical stamping 108 may be disengaged from circuit board 106 when no force is applied to button B. According to an exemplary embodiment, when slide 104 is in the default position, pins 102 may be in the extended position and located at the deepest part or notch of sloped surfaces 1201 of carrier 120; spring S may provide an outward force to pins 102 to bias pins 102 toward the extended position and urge pins 102 to slide across sloped surfaces 1201 toward the deepest part of surfaces 1201.

According to an exemplary embodiment as shown schematically in FIG. 6B, slide 104 may be in the forward position within carrier 120 and electrical stamping 108 may contact circuit board 106 when button B is moved in a forward direction; pins 102 may move to the first retracted position and compress spring S (see FIG. 8A) within slide 104 as the ends of pins 102 slide along the sloped surfaces 1201 of carrier 120. As shown schematically in FIGS. 6A and 6B, when pins 102 move between the extended/default position and the first retracted position, pins 102 may compress spring S and travel along sloped surfaces 1201 from the deepest portion of surfaces 1201 to an angled portion of surfaces 1201. Spring S may bias pins 102 toward the extended position within the deepest portion of surfaces 1201 unless button B is held in the forward or backward direction.

According to an exemplary embodiment as shown schematically in FIG. 6C, slide 104 may be in the backward position within carrier 120 and electrical stamping 108 may contact circuit board 106 when button B is moved in a backward direction; pins 102 may move to the second retracted position on the opposite end of sloped surfaces 1201; pins 102 may compress spring S (see FIG. 8A) within slide 104 as the ends of pins 102 slide along the sloped surfaces 1201 of carrier 120 from the deepest portion of surfaces 1201 to the angled portion of surfaces 1201.

Figure 7A:
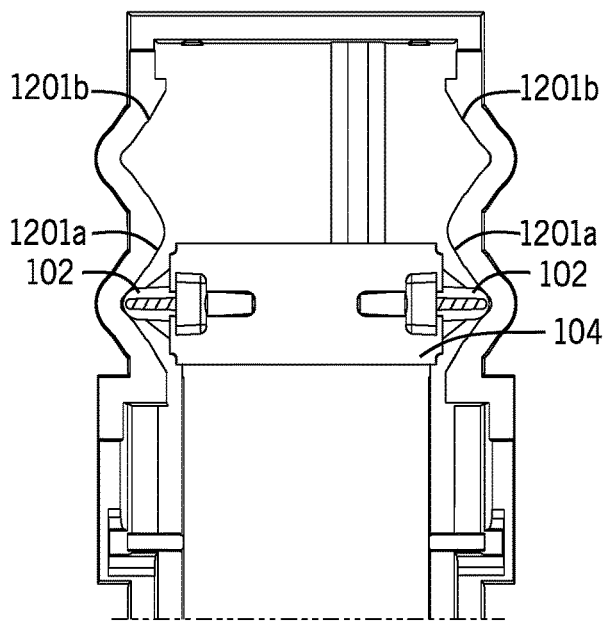
FIGS. 7A to 7C are schematic partial top views of a switch mechanism for a vehicle interior component according to an exemplary embodiment.
Figure 7B:
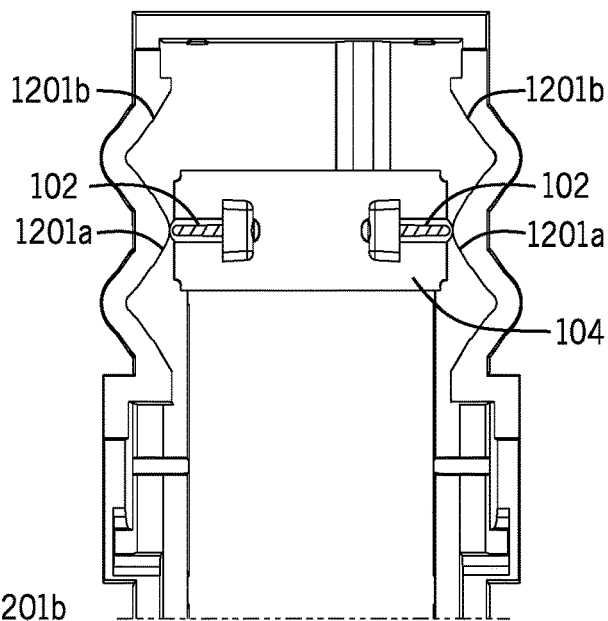
Figure 7C:
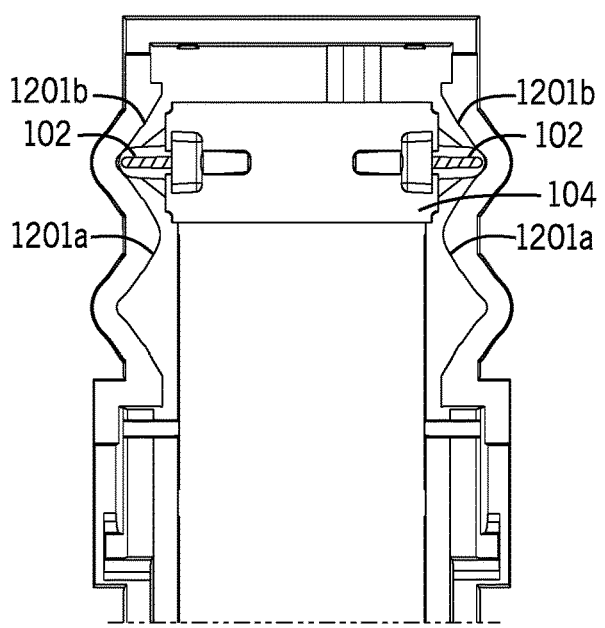

According to an exemplary embodiment as shown schematically in FIGS. 7A to 7C, switch mechanism 100 may comprise two or more sets of sloped surfaces 1201 provided on the sides of carrier 120. As shown schematically in FIGS. 7A to 7C, carrier 120 may comprise a first set of sloped surfaces 1201a and a second set of sloped surfaces 1201b. As shown schematically in FIG. 7A, slide 104 is in a first default position; detent pins 102 are in an extended position and located in the deepest portion of the first set of sloped surfaces 1201a. As shown schematically in FIG. 7B, slide 104 is in an intermediate position between the first default position and a second default position; detent pins 102 are in a retracted position and located at a shallow position between sloped surfaces 1201a and 1201b. As shown schematically in FIG. 7C, slide 104 is in the second default position; detent pins 102 are in the extended position and located in the deepest portion of the second set of sloped surfaces 1201b.

Figure 8C:
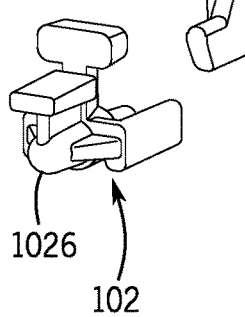
FIG. 8C is a schematic perspective partial view of a sub-assembly of a switch mechanism for a vehicle interior component according to an exemplary embodiment.
Figure 8C:
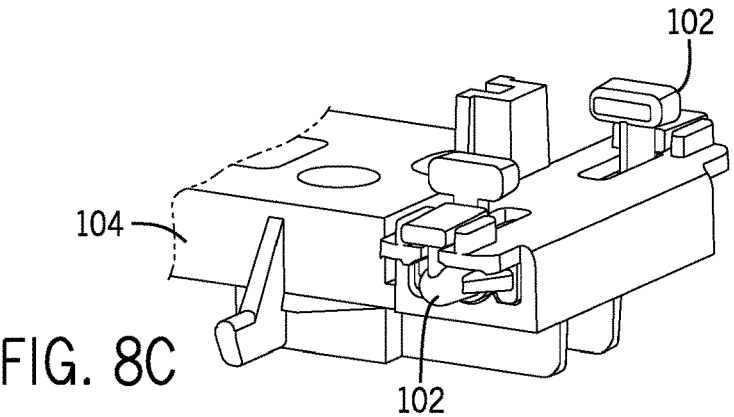

According to an exemplary embodiment as shown schematically in FIGS. 8A to 8C, switch or switch mechanism 100 may include a sub-assembly 130. As shown schematically in FIGS. 8A and 8B, sub-assembly 130 may comprise a slide 104, a spring S, an opening 1047 provided in slide 104 for spring S and two opposing detent pins 102. As shown schematically in FIG. 8A, each pin 102 may include a core 1023 configured to be positioned within the opening provided through a corresponding end of spring S. Spring S may be compressed within opening 1047 when pins 102 are provided on each side of slide 104 and the ends of pins 102 may be engaged with the sloped surfaces 1201 of carrier 120 when sub-assembly 130 is positioned within carrier 120. According to an exemplary embodiment, spring S may provide an outward force to pins 102 to urge the ends of pins 102 against sloped surfaces 1201 of carrier 120. As shown schematically in FIG. 8A, sloped surfaces 1201 may be configured as a v-shaped notch with angled surfaces. As shown schematically in FIG. 8A, pins 102 may be in an extended position and located at a deepest part of the sloped surfaces 1201 when slide 104 is in the default position; spring S may be configured to hold pins 102 in the extended position within the deepest part of sloped surfaces 1201 and reduce the wiggle/wobble of pins 102. The ends of pins 102 may be configured to engage the sloped surfaces 1201 of carrier 120 and the outward force provided by spring S against pins 102 urges pins 102 to slide along the sloped surfaces 1201 and into the extended position.

According to an exemplary embodiment as shown schematically in FIG. 8A, pins 102 may have a length indicated as LP; length LP of pins 102 may be configured to provide stability to pins 102 and sub-assembly 130 and to reduce the wiggle/wobble of pins 102 when sliding along sloped surfaces 1201 of carrier 1201. As shown schematically in FIG. 8A, spring S may have a length indicated as LS when pins 102 are in the extended position and slide 104 is in the default position. When pins 102 slide along slopes surfaces 1201 away from the deepest portion of sloped surfaces 1201 and into a retracted position, spring S may compress within opening 1047 and the length of spring S may be reduced to a length less than length LS. As shown schematically in FIG. 8A, each core 1023 of pins 102 may be configured to facilitate the use of a spring S may have an increased length LS; a variation of length LS may provide variations in performance of spring S (e.g., lower stiffness, linearity of force, etc.). According to an exemplary embodiment, switch mechanism may be configured with spring S having a length LS that provides a generally constant/linear performance during operation of switch mechanism.

According to an exemplary embodiment as shown schematically in FIGS. 8A and 8B and 9A and 9B, pins 102 may comprise a feature configured as guides 1024 positioned on each side of core 1023 and configured to guide pins 102 within opening 1047 of slide 104. According to an exemplary embodiment as shown schematically in FIG. 8A, guides 1024 may be configured to engage and slide along walls 1048 and 1049 of opening 1047 when pins 102 are engaged with slide 104. According to an exemplary embodiment, guides 1024 may be configured to stabilize pins 102 within opening 1047 and reduce the wiggle/wobble of pins 102. According to an exemplary embodiment, guides 1024 assist in stabilizing pins 102 by engaging walls 1048 and 1049 of opening 1047 and reducing side-to-side or lateral movement of pins 102 within opening 1047. According to an exemplary embodiment, slide 104 may comprise a top wall 1044 that may restrict vertical movement of pins 102 within opening 1047 by engaging guides 1024 when pins 102 slide within opening 1047. See FIGS. 3C and 9A.

According to an exemplary embodiment as shown schematically in FIGS. 8B and 8C, pins 102 may comprise a feature configured as a protrusion 1021 configured to slide along ribs 1041 located outside of opening 1047 of slide 104 when pins 102 are engaged with slide 104; ribs 1041 may be configured as elongated segments or rails provided on wall 1044 of slide 104 and each side of slots 1045 and 1046. See FIG. 3C. As shown schematically in FIG. 8B, protrusion 1021 may be positioned generally above the outer end 1026 of pin 102; outer end 1026 may be configured to engage and slide along sloped surface 1201 of carrier 120. According to an exemplary embodiment, protrusion may be configured as elongated ribs, segments, plates or bars. As shown schematically in FIG. 8C, protrusion 1021 may be configured to generally conform to and engage ribs 1041 when pins 102 are positioned within opening 1047. According to an exemplary embodiment, protrusion 1021 may be configured to stabilize pins 102 when pins 102 slide within opening 1047 and outer ends 1026 slide along sloped surfaces 1201. According to an exemplary embodiment, protrusion 1021 may assist stabilizing pins 102 and reducing wiggle/wobble by engaging ribs 1041 of slide 104 and preventing side-to-side or lateral movement of pins 102. According to an exemplary embodiment, protrusion 1021 may additionally assist in stabilizing pins 102 by engaging wall 1044 of slide 104 and restricting vertical movement of pin 102 relative to slide 104. See FIGS. 9A-9C.

Figure 9A:
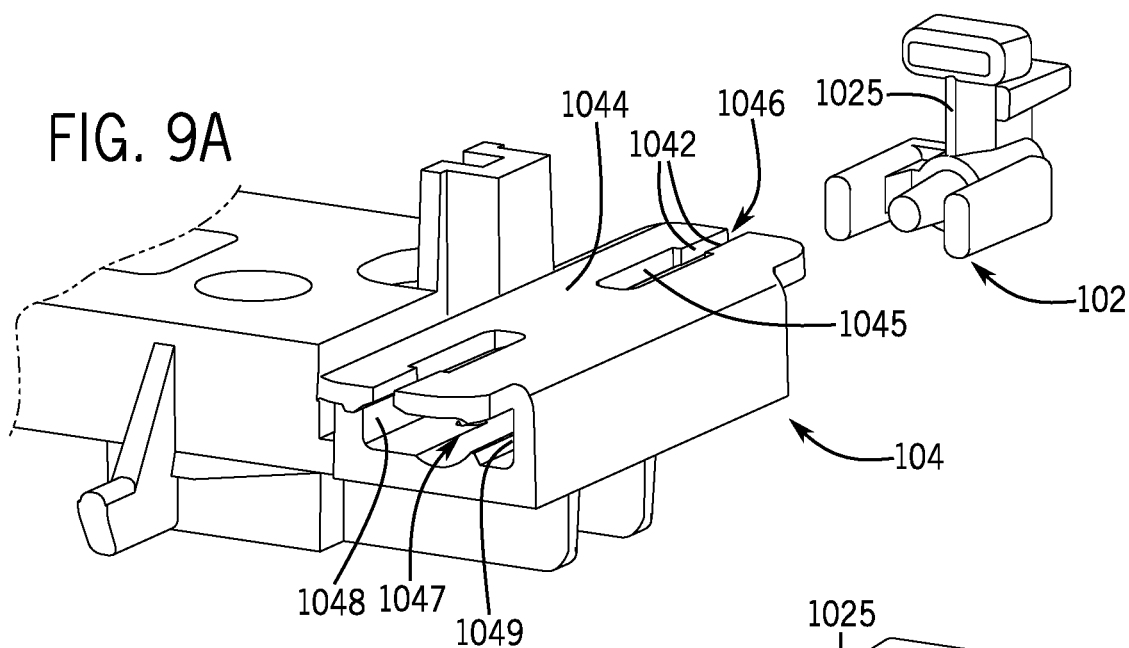
FIGS. 9A to 9C are schematic perspective views of a sub-assembly of a switch mechanism for a vehicle interior component according to an exemplary embodiment.
Figure 9B:
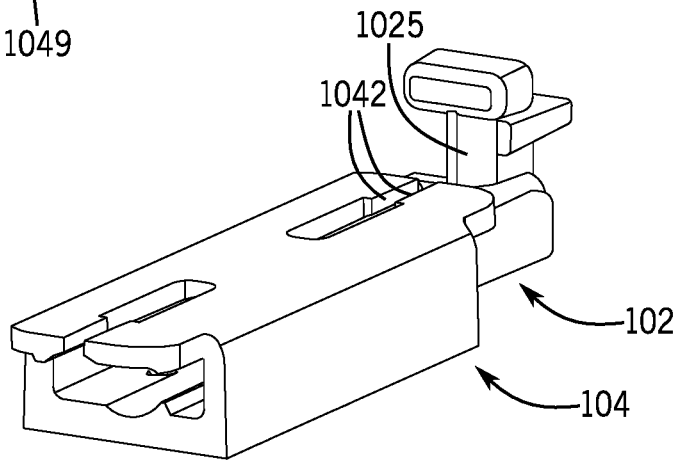
Figure 9C:
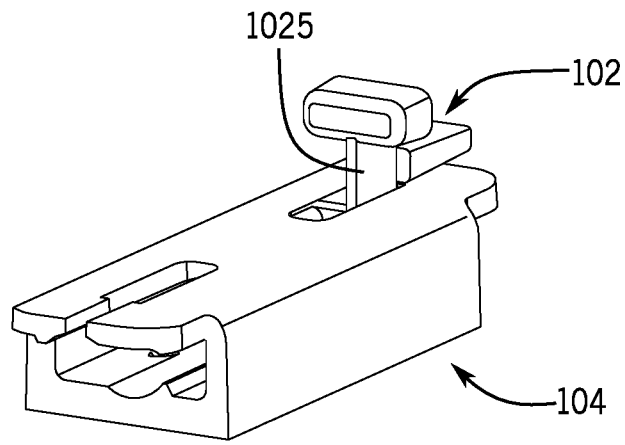

According to an exemplary embodiment as shown schematically in FIGS. 9A-9C, slide 104 may comprise a top wall 1044 provided above opening 1047. As shown schematically in FIG. 9A, top wall 1044 may include a first slot 1045 extending inward from the end of slide 104. First slot 1045 may be configured to receive wedge 1025 of pin 102 when pin 102 is inserted into opening 1047 and assembled to slide 104. According to an exemplary embodiment, top wall 1044 may include a second slot 1046 extending inward from the ends of slide 104 and in alignment with first slot 1045. As shown schematically in FIG. 9A, second slot 1046 may be configured to extend a portion of the length of first slot 1046 and have a reduced width providing ledges 1042 on each side of second slot 1046. As shown schematically in FIGS. 9B and 9C, second slot 1046 may receive wedge 1025 of pin 102 and allow wedge 1025 to slide through second slot 1046 and into first slot 1045 when assembling pin 102 to slide 104. According to an exemplary embodiment, second slot 1046 may be configured to prevent movement of pin 102 relative to slide 104 after wedge 1025 has slid through second slot 1046 and into first slot 1045; ledges 1042 may prevent wedge 1025 from sliding backward into second slot 1046.

According to an exemplary embodiment, sub-assembly 130 may be assembled in a series of steps. A first detent pin 102 may assembled to one side of slide 104 by inserting pin 102 into opening 1047 of slide 104 and sliding wedge 1025 of pin 102 through second slot 1046 and into first slot 1045 to secure pin 102 to slide 104. See FIGS. 9A-9C. Spring S may be inserted into opening 1047 of slide 104 and one end of spring S may engage core 1023 of first detent pin 102. See FIG. 8B. A second detent pin 102 may be assembled to the side of slide 104 opposing first detent pin 102 by inserting pin 102 into opening 1047 and securing wedge 1025 of second detent pin 102 within first slot 1045. See FIG. 8C. Handles 1022 may be provided on each detent pin 102 to facilitate sliding pins 102 toward each other to secure and assemble both pins 102 to slide 104 on each side of spring S.

According to an exemplary embodiment as shown schematically in FIGS. 3A and 8A to 8C, switch mechanism may comprise a carrier 120 with sloped surfaces 1201, a slide 104 configured to slide within carrier 120, at least one pin 102 configured to move within slide 104 to center slide 104 in carrier 120, and a spring S configured to move the at least one pin 102 within slide 104. Spring S may be positioned within an opening 1047 of slide 104 and pin 102 may be assembled to slide 104 to constrain spring S. According to an exemplary embodiment, the at least one pin 102 may comprise a feature configured as a guide 1024 and/or a protrusion 1021 to guide movement of the at least one pin 102 relative to slide 104 and stabilize the at least one pin 102 within slide 104. As shown schematically in FIGS. 8A to 8C, the at least one pin 102 may comprise a first pin 102 and a second pin 102 spaced apart by spring S. According to an exemplary embodiment, first pin 102 may comprise a first feature configured as a protrusion 1021 or a guide 1024 to guide movement of first pin 102 relative to slide 104 and second pin 102 may comprise a second feature configured as a protrusion 1021 or a guide 1024 to guide movement of second pin 102 relative to slide 104. According to an exemplary embodiment, the first feature and the second feature may be spaced apart by a distance greater than a length of spring S when installed in slide 104.

According to an exemplary embodiment, the first feature may comprise a first protrusion 1021 and the second feature may comprise a second protrusion. According to an exemplary embodiment as shown schematically in FIG. 8B, slide 104 may comprise a first set of ribs 1041 and a second set of ribs 1041. According to an exemplary embodiment, first protrusion 1021 may be configured to move within the first set of ribs 1041 and second protrusion 1021 may be configured to move within the second set of ribs 1041 to guide movement of first pin 102 and second pin 102 relative to slide 104. According to an exemplary embodiment, the first set of ribs 1041 may restrict lateral movement of first protrusion 1021 when first protrusion 1021 is located between the first set of ribs 1041 to stabilize first pin 102 within slide 104 and reduce wiggle/wobble of first pin 102 relative to slide 104 and carrier 120. According to an exemplary embodiment, the second set of ribs 1041 may restrict lateral movement of second protrusion 1021 when second protrusion 1021 is located between the second set of ribs 1041 to stabilize second pin 102 within slide 104 and reduce wiggle/wobble of second pin 102 relative to slide 104 and carrier 120. According to an exemplary embodiment, slide 104 may be configured so that the first set of ribs 1041 and the second set of ribs 1041 are spaced apart by a distance greater than a length of spring S when spring S is positioned within slide 104.

According to an exemplary embodiment as shown schematically in FIGS. 8A to 8C, the feature may comprise a first and second guide 1024 provided on the at least one pin 102. First and second guides 1024 may be configured as elongated arms, segments, rails, rods, beams or similar structures. Slide 104 may comprise opening 1047 having a first wall 1048 and a second wall 1049. According to an exemplary embodiment, first guide 1024 may be configured to slide against first wall 1048 and second guide 1024 may be configured to slide against second wall 1049 when the at least one pin 102 slides within opening 1047 of slide 104 to guide movement of the at least one pin 102 relative to slide 104. According to an exemplary embodiment, first and second guides 1024 are spaced apart from one another a distance approximately equal to a distance between first and second walls 1048 and 1049 to restrict lateral movement of guides 1024 relative to walls 1048 and 1049 and reduce wiggle/wobble of the at least one pin 102 relative to slide 104. According to an exemplary embodiment, first guide 1024 and second guide 1024 are spaced apart by a distance greater than a diameter of spring S so that spring S may be received between guides 1024.

Figure 10A:
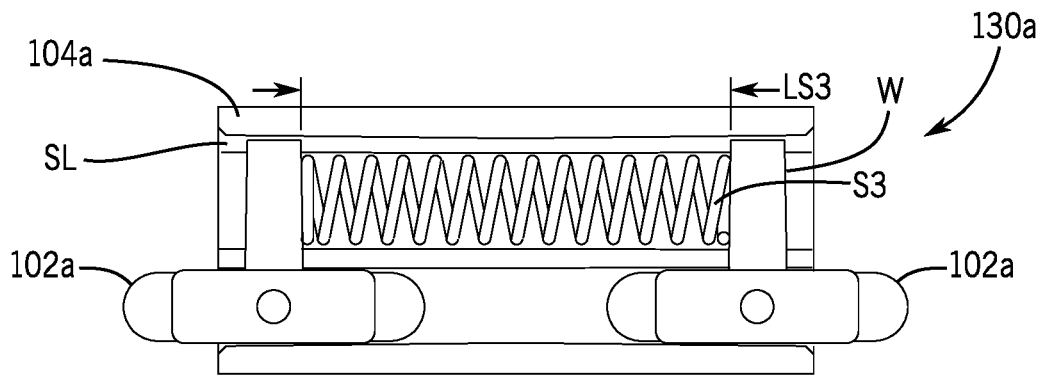
FIG. 10A is a schematic cross-section top view of a sub-assembly of a switch mechanism for a vehicle interior component according to an exemplary embodiment.
Figure 10B:
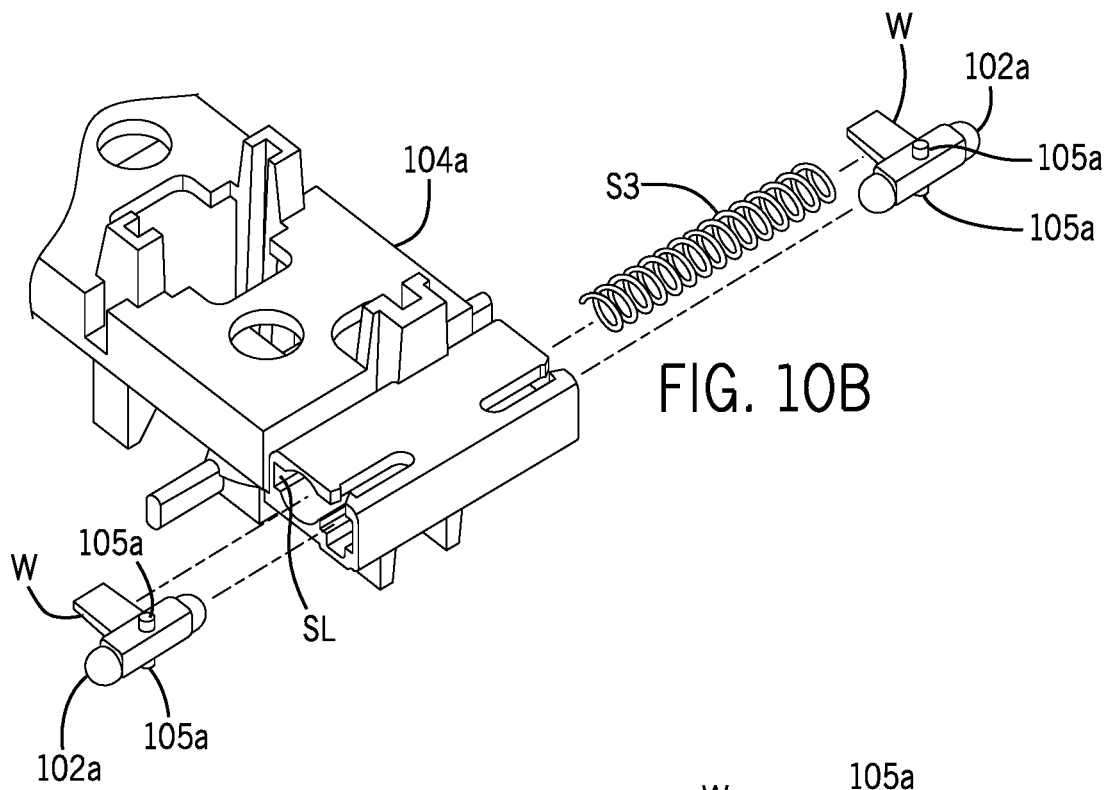
FIG. 10B is a schematic perspective exploded partial view of a sub-assembly of a switch mechanism for a vehicle interior component according to an exemplary embodiment.
Figure 10C:
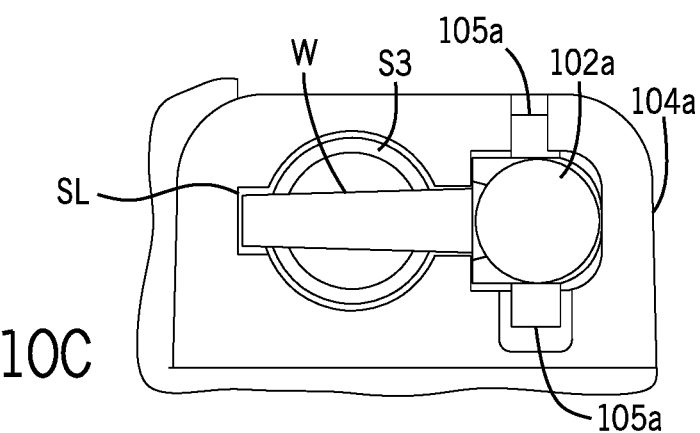
FIG. 10C is a schematic detail side view of a sub-assembly of a switch mechanism for a vehicle interior component according to an exemplary embodiment.

According to an exemplary embodiment as shown schematically in FIGS. 10A-10C, a sub-assembly 130a for a switch or switch mechanism may comprise a spring S, a slide 104a with a housing or opening for spring S3 and two opposing detent pins 102a. Each detent pin 102a may comprise a wing W configured to constrain an end of spring S3 within the housing provided through slide 104a. As shown schematically in FIG. 10A, each detent pin 102a may include an outer end or tip configured to engage and slide along a sloped surface of a corresponding carrier (e.g., sloped surfaces 1201 of a carrier 120). As shown schematically in FIG. 10A, both detent pins 102a may maintain spring S3 within slide 104a. In the embodiment shown schematically in FIG. 10A, detent pins 102a are in an extended position, spring S3 is compressed between detent pins 102a, and slide 104a in the default position (e.g., where the outer ends of each pin 102a is positioned within the deepest part or notch of the sloped surfaces 1021 of a carrier 120). At the default position, the length of spring S3 is indicated as LS3. According to an exemplary embodiment, LS3 is substantially the same length as LS.

As shown schematically in FIGS. 10A-10C, slide 104a may include a slot SL on one side of the opening or housing provided through slide 104a for holding spring S. As shown schematically in FIG. 10C, slide 104a may include a pin slot and one or more guide pin slots provided on the opposing end of housing provided through slide 104a (e.g., the side of housing opposite slot SL); the upper guide pin housing may extend through the top of slide 104a. As shown schematically in FIGS. 10A-10C, each detent pin 102a may include wing W configured to correspond to slot SL and guiding pins 105a configured to correspond to the guide pin slots located on the opposing side of the housing. According to an exemplary embodiment, wing W and slot SL may operate to maintain wing W over then outer end of spring S3 and to stabilize pin 102a within the housing by reducing the wiggle/wobble between pin 102a and the housing. According to an exemplary embodiment, guiding pins 105a and corresponding guide pin slots provided in the housing may also be configured to stabilize pin 102a by reducing the wiggle/wobble between pin 102a and the housing. According to an exemplary embodiment, wings W may be configured and intended to provide more space for variation in the size/length of the spring S3 (e.g., as may be useful to achieve intended performance, stiffness, linearity, etc. in the range of motion).

According to an exemplary embodiment, sub-assembly 130a may be assembled in steps. A first detent pin 102a may be assembled to slide 104a by sliding pin 102a into the housing and positioning the end of wing W in slot SL and guiding pins 105a in the guide pin slots of the housing; slide 104a and pin 102a may be configured to allow pin 102a to be snapped in placed end restricted from being removed from the housing of slide 104a. Spring S3 may be placed within the housing of slide 104a and a second detent pin 102a may be assembled to slide 104a on the side opposite first detent pin 102a; second detent pin may be assembled to slide 104a and secured in place in the same manner as first detent pin 102a. See FIGS. 10A-10C.

Figure 11:
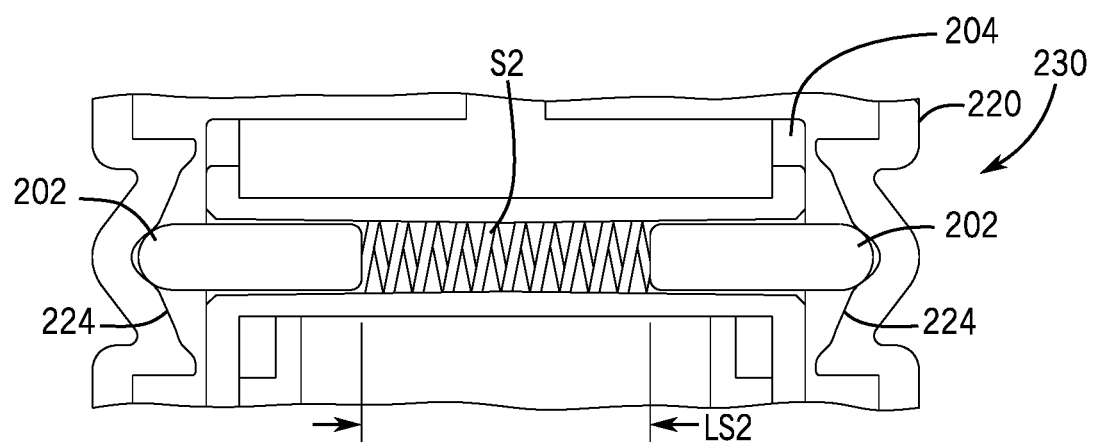
FIG. 11 is a schematic cross-section top view of a sub-assembly of a switch mechanism for a vehicle interior component according to an exemplary embodiment.

Referring to FIG. 11, a sub-assembly shown as a detent/guide mechanism 230 for a switch or switch mechanism is shown generally/schematically according to an exemplary embodiment. Sub-assembly 230 may comprise a spring S2, a housing for spring S2 (e.g. space defined through end of a slide 204) and two opposing members/pins shown as detent pins 202. As shown schematically in FIG. 11, each pin/member shown as detent pin 202 may be positioned within a portion of the housing for spring S2. The ends of spring S2 may be received within part of pins 202 and constrained within the housing of slide 204. According to an exemplary embodiment, when slide 204 is in the default position, pins 202 may be in the extended position and spring S2 may be compressed (e.g. from default/installed spring length) between opposing pins 202 within the housing. When pins 202 are in the extended position, the ends of pins 202 may be positioned within the deepest portion or notch of sloped surfaces 224 of carrier 220. As shown schematically in FIG. 11, according to an exemplary embodiment, pins 202 may be pushed against sloped surfaces 224 by spring S2 and configured to slide across surfaces shown as sloped surfaces 224 as slide 204 moves within carrier 220. As shown schematically in FIG. 11, the length of spring S2 at the default position (e.g., when spring S2 has been installed/fit into the housing and pins 202 are in the extended position and positioned within the notch of sloped surfaces 224) is indicated as length LS2. As shown schematically in FIG. 11, the length LS2 of spring S2 may be limited by the portion of each pin 202 occupying the housing of slide 204 (e.g. at the default position when installed the spring may be compressed in length at least partially from an uninstalled/uncompressed state or length for fit into the housing and engagement with the pins).

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A switch mechanism for a vehicle interior component comprising:
   (a) a carrier;
   (b) a slide configured to slide within the carrier;
   (c) at least one pin configured to move within the slide to center the slide in the carrier; and
   (d) a spring configured to move the at least one pin within the slide;
   wherein the at least one pin comprises a feature configured to guide movement of the at least one pin relative to the slide;
   wherein the feature comprises a protrusion configured to move against the slide to guide movement of the at least one pin relative to the slide;
   wherein the slide comprises a rib;
   wherein the protrusion is configured to slide against the rib to guide movement of the at least one pin relative to the slide;
   wherein the carrier comprises a surface;
   wherein the at least one pin is configured to slide against the surface of the carrier;
   wherein the rib extends from the slide away from the surface of the carrier.

2. The switch mechanism of claim 1 wherein the rib comprises two ribs; wherein the protrusion moves between the two ribs to guide movement of the at least one pin relative to the slide.

3. The switch mechanism of claim 1 wherein the slide comprises an opening; wherein the spring is contained within the opening; wherein the rib extends beyond the opening.

4. The switch mechanism of claim 1 wherein the feature comprises a first guide and a second guide; wherein the slide comprises a first wall and a second wall; wherein the first guide is configured to slide along the first wall and the second guide is configured to slide along the second wall to guide movement of the at least one pin relative to the slide.

5. The switch mechanism of claim 4 wherein the slide comprises an opening; wherein the spring is provided within the opening; wherein the first guide and the second guide are provided within the opening; wherein the first guide and the second guide are separated by a distance greater than a diameter of the spring.

6. The switch mechanism of claim 1 wherein the at least one pin comprises a handle configured for movement to compress the spring.

7. The switch mechanism of claim 1 wherein the switch mechanism further comprises an electrical circuit; and wherein the slide is centered in the carrier to provide engagement of the electrical circuit.

8. The switch mechanism of claim 1 wherein the slide is configured (a) to move from a default position to a forward position, (b) to move from the forward position to the default position, (c) to move from the default position to a rearward position, (d) to move from the rearward position to the default position; wherein the at least one pin is configured to move between a first retracted position, an extended position, and a second retracted position; and wherein the at least one pin is configured to be in the extended position when the slide is in the default position.

9. The switch mechanism of claim 1 wherein the slide comprises a carriage; wherein the carrier comprises at least one of (a) a set of notches, (b) a set of guides; (c) a set of angled surfaces; wherein the spring is configured to bias the at least one pin against one of the set of notches, set of guides and set of angled surfaces.

10. The switch mechanism of claim 1 wherein the vehicle interior component is at least one of (a) a console; (b) an overhead console; (c) an actuator for a vehicle system; (d) an actuator for a sunroof; wherein the at least one pin is configured to move between a retracted position and an extended position to guide movement of the slide to operate at least one of (a) a movable roof, (b) a door of the vehicle; and wherein the spring is configured to move the at least one pin to the extended position.

11. A switch mechanism for a vehicle interior component comprising:
   (a) a carrier;
   (b) a slide configured to slide within the carrier;
   (c) at least one pin configured to move within the slide to center the slide in the carrier; and
   (d) a spring configured to move the at least one pin within the slide;
   wherein the at least one pin comprises a feature configured to guide movement of the at least one pin relative to the slide;
   wherein the at least one pin comprises a first pin and a second pin separated by the spring;
   wherein the first pin comprises a first feature configured to guide movement of the first pin relative to the slide and the second pin comprises a second feature configured to guide movement of the second pin relative to the slide;
   wherein the first feature and the second feature are separated by a distance greater than a length of the spring.

12. The switch mechanism of claim 11 wherein the first feature comprises a first protrusion and the second feature comprises a second protrusion; wherein the slide comprises a first set of ribs and a second set of ribs; wherein the first protrusion moves within the first set of ribs and the second protrusion moves within the second set of ribs to guide movement of the first and second pins relative to the slide.

13. The switch mechanism of claim 12 wherein the first set of ribs and the second set of ribs are separated by a distance greater than the length of the spring.

14. A switch mechanism for a vehicle interior component comprising:
   (a) a carrier;
   (b) a slide configured to slide within the carrier;
   (c) at least one pin configured to move within the slide to center the slide in the carrier; and
   (d) a spring configured to move the at least one pin within the slide;
   wherein the at least one pin comprises a feature configured to guide movement of the at least one pin relative to the slide;
   wherein the slide comprises a wall comprising a first slot;
   wherein the at least one pin is configured to move within the first slot of the wall of the slide;
   wherein the slot comprises an aperture;
   wherein the at least one pin extends below and above the wall of the slide;
   wherein the at least one pin extends through the aperture.

15. The switch mechanism of claim 14 wherein the wall of the slide comprises a second slot configured for assembly of the at least one pin to the slide.

16. The switch mechanism of claim 15 wherein the second slot is configured to prevent movement of the at least one pin relative to the slide.

17. The switch mechanism of claim 15 wherein the at least one pin comprises a wedge configured to slide within the second slot for assembly of the at least one pin to the slide; wherein the wedge is configured to prevent movement of the at least one pin within the second slot after assembly of the at least one pin with the slide.

18. The switch mechanism of claim 14 wherein the slide comprises a carriage; wherein the carrier comprises at least one of (a) opposed notches, (b) opposed guides; (c) opposed angled surfaces; wherein the spring is configured to bias the at least one pin against one of the opposed notches, opposed guides and opposed angled surfaces.

19. A switch mechanism for a vehicle interior component comprising:
   (a) a carrier;
   (b) a slide configured to slide within the carrier;
   (c) a pin configured to move within the slide to center the slide in the carrier; and
   (d) a spring configured to move the pin within the slide;
   wherein the pin comprises a feature configured to guide movement of the pin relative to the slide;
   wherein the feature comprises a first guide and a second guide configured to guide movement of the pin relative to the slide;
   wherein the first guide and the second guide are separated by a distance greater than a diameter of the spring.

20. The switch mechanism of claim 19 wherein the feature comprises a protrusion configured to move against the slide to guide movement of the pin relative to the slide; wherein the slide comprises a rib; wherein the protrusion is configured to slide against the rib to guide movement of the pin relative to the slide.

21. The switch mechanism of claim 19 wherein the slide comprises an opening, a first wall and a second wall; wherein the first guide is configured to slide along the first wall and the second guide is configured to slide along the second wall to guide movement of the pin relative to the slide; wherein the spring, the first guide and the second guide are provided within the opening.

* * * * *